(12) United States Patent
Yamada et al.

(10) Patent No.: US 11,842,508 B2
(45) Date of Patent: Dec. 12, 2023

(54) INFORMATION PROCESSING APPARATUS, INFORMATION PROCESSING METHOD, AND SYSTEM THAT INSPECTS A STATE OF A TARGET OBJECT USING DISTANCE INFORMATION

(71) Applicant: CANON KABUSHIKI KAISHA, Tokyo (JP)

(72) Inventors: Daisuke Yamada, Kawasaki (JP); Tomoaki Higo, Kawasaki (JP); Kazuhiko Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 39 days.

(21) Appl. No.: 16/745,159

(22) Filed: Jan. 16, 2020

(65) Prior Publication Data

US 2020/0242796 A1 Jul. 30, 2020

(30) Foreign Application Priority Data

Jan. 29, 2019 (JP) .................................. 2019-013224

(51) Int. Cl.
*G06K 9/00* (2022.01)
*G06T 7/70* (2017.01)
(Continued)

(52) U.S. Cl.
CPC .............. *G06T 7/70* (2017.01); *G06F 18/214* (2023.01); *G06F 18/26* (2023.01); *G06F 18/28* (2023.01);
(Continued)

(58) Field of Classification Search
CPC .................. G06T 7/0004; G06T 7/0006; G06T 7/0008; G06T 7/001; G06T 7/50; G06T 7/521; G06T 7/55; G06T 7/70; G06T 7/73; G06T 7/74; G06T 7/75; G06T 7/77; G06T 7/97; G06T 2207/10004; G06T 2207/10028; G06T 2207/20104; G06T 2207/30108;
(Continued)

(56) References Cited

U.S. PATENT DOCUMENTS

| 10,373,302 | B2 * | 8/2019 | Saeki | G06T 7/0004 |
| 2005/0104968 | A1 * | 5/2005 | Aoki | G06T 1/0007 348/207.11 |
| 2009/0059242 | A1 * | 3/2009 | Fujieda | G06T 7/0006 356/625 |

(Continued)

FOREIGN PATENT DOCUMENTS

| JP | 11-49287 A | 2/1999 |
| JP | 2012193980 A | 10/2012 |

(Continued)

*Primary Examiner* — Eric Rush
(74) *Attorney, Agent, or Firm* — Canon U.S.A, Inc. IP Division

(57) ABSTRACT

An information processing apparatus that inspects a state of a target object using distance information obtained by measuring the target object includes an acquisition unit configured to acquire position information indicating a position of a part of the target object based on the distance information, and an output unit configured to output, in a case where a position of a part of the target object does not satisfy a predetermined condition, based on the position information and the condition, information regarding a direction in which the target object is to be moved from a current state of the target object to a state satisfying the condition.

21 Claims, 24 Drawing Sheets

(51) Int. Cl.
  *G06T 7/60* (2017.01)
  *G06F 18/28* (2023.01)
  *G06F 18/26* (2023.01)
  *G06T 7/00* (2017.01)
  *G06F 18/214* (2023.01)

(52) U.S. Cl.
  CPC .......... *G06T 7/0002* (2013.01); *G06T 7/0008* (2013.01); *G06T 7/60* (2013.01); *G06T 7/97* (2017.01); *G06T 2207/30108* (2013.01); *G06V 2201/12* (2022.01)

(58) Field of Classification Search
  CPC .......... G06T 2207/30164; G06T 2207/30244; G06T 7/0002; G06T 7/60; G06K 7/1456; G06K 9/00201; G06K 9/00664; G06K 9/00671; G06K 9/03; G06K 9/033; G06K 9/20; G06K 9/2054; G06K 9/32; G06K 9/3233; G06K 9/3241; G06K 9/3275; G06K 2209/19; G06K 2209/21; G06K 2209/40; G05B 2219/37555; G05B 2219/40006; G05B 2219/40564; G05B 2219/40607; G06V 10/10; G06V 10/12; G06V 10/147; G06V 20/64; G06V 2201/12; G06F 18/28; G06F 18/214; G06F 18/26
  USPC ................ 382/100, 101, 103, 106, 141–143, 382/152–154, 181, 195, 199, 203, 209, 382/215–219, 224, 282, 291, 325, 145, 382/147, 149, 151, 286, 289; 348/86, 87, 348/91, 92, 94, 95, 135, 142, 169, 172, 348/125, 127–130; 700/56, 57, 59–62, 700/95, 114, 213, 214, 222, 230; 702/150–153, 35, 81, 82, 94, 154, 166, 702/167; 356/139.1, 237.1, 239.1, 239.4, 356/239.7, 240.1
  See application file for complete search history.

(56) References Cited

U.S. PATENT DOCUMENTS

| | | | |
|---|---|---|---|
| 2009/0178370 A1* | 7/2009 | Uebel | B67B 3/264 53/314 |
| 2010/0266206 A1* | 10/2010 | Jo | G06V 40/167 382/190 |
| 2014/0015957 A1* | 1/2014 | Fujikawa | G06T 7/74 348/95 |
| 2014/0301632 A1* | 10/2014 | Ikeda | G06T 7/0004 382/152 |
| 2015/0254830 A1* | 9/2015 | Shimodaira | G06T 7/0006 382/141 |
| 2016/0300109 A1* | 10/2016 | Aonuma | G06K 9/00671 |
| 2017/0018067 A1* | 1/2017 | Rourke | G06V 10/44 |
| 2017/0132451 A1* | 5/2017 | Namiki | G06V 10/757 |
| 2017/0236301 A1* | 8/2017 | Kobayashi | G06T 7/579 382/103 |
| 2017/0312031 A1* | 11/2017 | Amanatullah | G06T 7/0012 |
| 2019/0042831 A1* | 2/2019 | Ahn | G06V 10/147 |
| 2019/0096083 A1* | 3/2019 | Arano | G06T 7/70 |
| 2019/0175011 A1* | 6/2019 | Jensen | G06T 7/70 |
| 2019/0212125 A1* | 7/2019 | Deleule | G06K 9/00288 |
| 2020/0059596 A1* | 2/2020 | Yoo | G06T 7/50 |
| 2020/0242335 A1* | 7/2020 | Eshima | G06V 10/147 |
| 2020/0299169 A1* | 9/2020 | Cosneau | G07C 3/14 |

FOREIGN PATENT DOCUMENTS

| | | |
|---|---|---|
| JP | 2017010327 A | 1/2017 |
| JP | 2017061025 A | 3/2017 |
| WO | 2004/084140 A1 | 9/2004 |

* cited by examiner

INFORMATION PROCESSING APPARATUS, INFORMATION PROCESSING METHOD, AND SYSTEM THAT INSPECTS A STATE OF A TARGET OBJECT USING DISTANCE INFORMATION

BACKGROUND

Field of the Disclosure

The present disclosure relates to a technique for inspecting a target object from a captured image.

Description of the Related Art

In production sites, such as factories, an inspection device that uses images has been recently introduced for mechanically automating an inspection work that had been manually performed. For example, in a product state inspection performed in a production line, the state of a product is determined based on a result obtained by measuring the product using various measuring devices. In Japanese Patent Application Laid-Open No. 11-49287, when the slanting of a lid of a plastic bottle is inspected, the state of the lid is detected based on an image captured from the side of the product.

In Japanese Patent Application Laid-Open No. 11-49287, if the slanting of a target object is detected, while the user is notified of an abnormality, the user cannot be immediately informed of a method for correcting the inclined lid to an appropriate orientation. On the other hand, in constructing a system having higher productivity than that in Japanese Patent Application Laid-Open No. 11-49287, by informing a person or a robot of a method for correcting to a correct state the direction or the position of a product determined to be a defective product in an inspection, a decline in the occurrence rate of defective products can be expected.

SUMMARY

Various embodiments have been devised in view of the above-described issues and are directed to outputting a method for correcting a state of a target object to an appropriate state if it is determined in an inspection that the target object is not in the appropriate state.

According to an aspect of some embodiments, an information processing apparatus that inspects a state of a target object using distance information obtained by measuring the target object includes an acquisition unit configured to acquire position information indicating a position of a part of the target object based on the distance information, and an output unit configured to output, in a case where a position of a part of the target object does not satisfy a predetermined condition, based on the position information and the condition, information regarding a direction in which the target object is to be moved from a current state of the target object to a state satisfying the condition.

Further features of various embodiments will become apparent from the following description of exemplary embodiments with reference to the attached drawings.

DESCRIPTION OF THE EMBODIMENTS

Hereinafter, exemplary embodiments will be described with reference to the attached drawings.

An inspection in a first exemplary embodiment refers mainly to an inspection of checking whether a part of a target object is planar. Specifically, an inspection to be performed in a packing process or a distribution process in a factory or shipping storage is assumed. In the inspection, it is checked whether an external packaging (the slope or the presence or absence of a lid or cap) or an internal packaging (the slope or the presence or absence of an inner lid) of a target object (a packing box of a product in this example) satisfies a predetermined condition.

In the first exemplary embodiment, in shipping a decorative box of a product, an inspection as to whether a part of a target object forms a plane is performed using information obtained from an image. The description will be given of an information processing apparatus used in an inspection as to whether a lid of an outer casing being a target object is slanting. In the inspection, if the target object does not satisfy a condition (the lid is not closed or is slanting), the information processing apparatus presents, to a person or a robot, an instruction for correcting the orientation of the lid. For the sake of simplicity, the lid described here is assumed to have a smooth and flat top surface (top surface in a case where the product is placed in a correct up-down direction, and a surface squarely facing an imaging apparatus).

Figure 1:
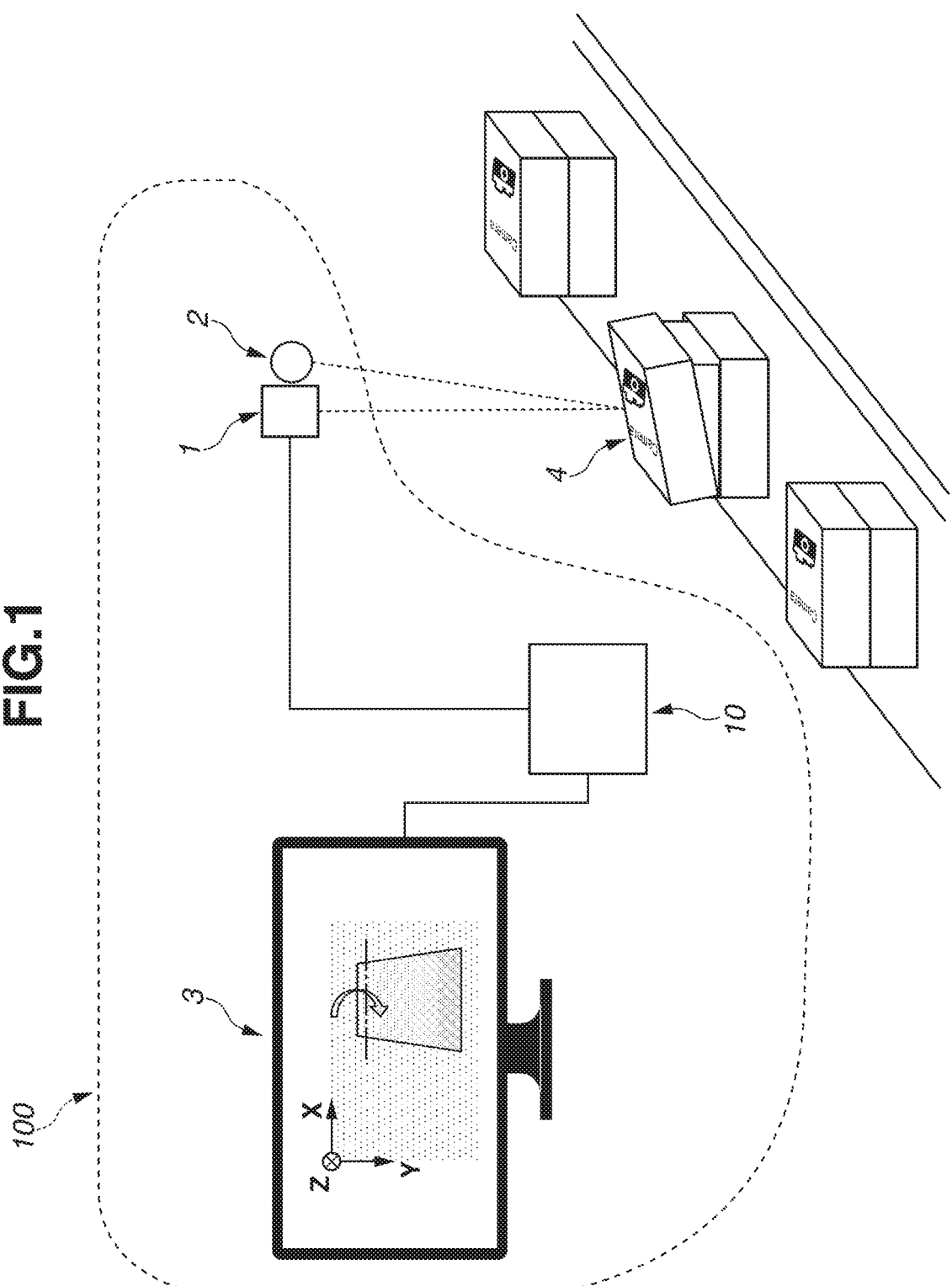
FIG. 1 is a diagram illustrating a configuration example of an information processing system.

FIG. 1 illustrates a configuration example of an information processing system 100 including an information processing apparatus 10 according to the present exemplary embodiment. An imaging apparatus 1 is a measuring device such as a digital camera that includes a lens and an electronic image sensor, and acquires the state of a target object 4 as image information. As the image information, the imaging apparatus 1 can acquire two-dimensional color image information, and can also acquire distance image information indicating a distance from the imaging apparatus 1 to the target object 4 in a case where the imaging apparatus 1 is a stereo camera. The image information output from the imaging apparatus 1 is input to the information processing apparatus 10. A light source 2 is an illumination device, for example, and emits illumination light for clearly visualizing a pattern or an edge of the target object. Alternatively, if the light source 2 is a projection device (e.g., projector), the imaging apparatus 1 acquires a distance image by the light source 2 emitting pattern light. The imaging apparatus 1 and the light source 2 may be fixedly arranged with respect to an image capturing target, or may be mounted on a movable mechanism portion such as a robot. A plurality of imaging apparatuses 1 may be provided.

An output device 3 includes a display that outputs information for correcting a part of the target object 4, for example, and outputs instruction information to the user using a graphical user interface (GUI). The instruction information is information indicating a difference between a current state of the target object and a desired state of the target object. Specific examples of the instruction information include position information indicating how far the current state is away from the desired state, and a correction method indicating how much the target object is to be moved for approaching the desired state. The output device 3 is not limited to a display device, and may be a reproduction device such as a speaker that reproduces sound or voice. In the output that uses a voice device, synthesized speech is used as the instruction information. Alternatively, a projection device such as a projector that projects instruction information onto the surface of the target object may be used as the output device 3. Alternatively, an output method that uses virtual reality (VR) may be employed. Specific examples of such output devices include a wearable device such as a head mounted display (HMD) or an augmented reality (AR) glasses. Using these output devices, instruction information for the target object 4 is presented in mixed reality (MR), AR, or VR. By using any one output device or a combination of a plurality these output devices, it is possible to promptly present a correction method to the user, if a target object is a defective product, and shorten a time taken for correcting the defective product.

The target object 4 refers to an object such as a package, a product, or a component that is handled in a production line of a factory. The target objects 4 are sequentially discharged from a manufacturing device by a belt conveyer, and one or a plurality of target objects 4 enters an image capturing range of the imaging apparatus 1 at the same time. In the present exemplary embodiment, the target objects 4 move to the image capturing range of the imaging apparatus 1. In a work such as a work of laying out products, in the case of correcting target objects arranged at fixed positions on a rack, correction of a target object arranged in a wrong direction or position from among the plurality of target objects can be performed by making the system movable. In this example, by capturing an image of the target object 4 from above, it is inspected whether the state of a lid being a part of the target object 4 is a desired state. Specifically, the desired state is assumed to be a state in which the lid forms a plane (parallel to a horizontal surface) in a closed state.

Figure 2:
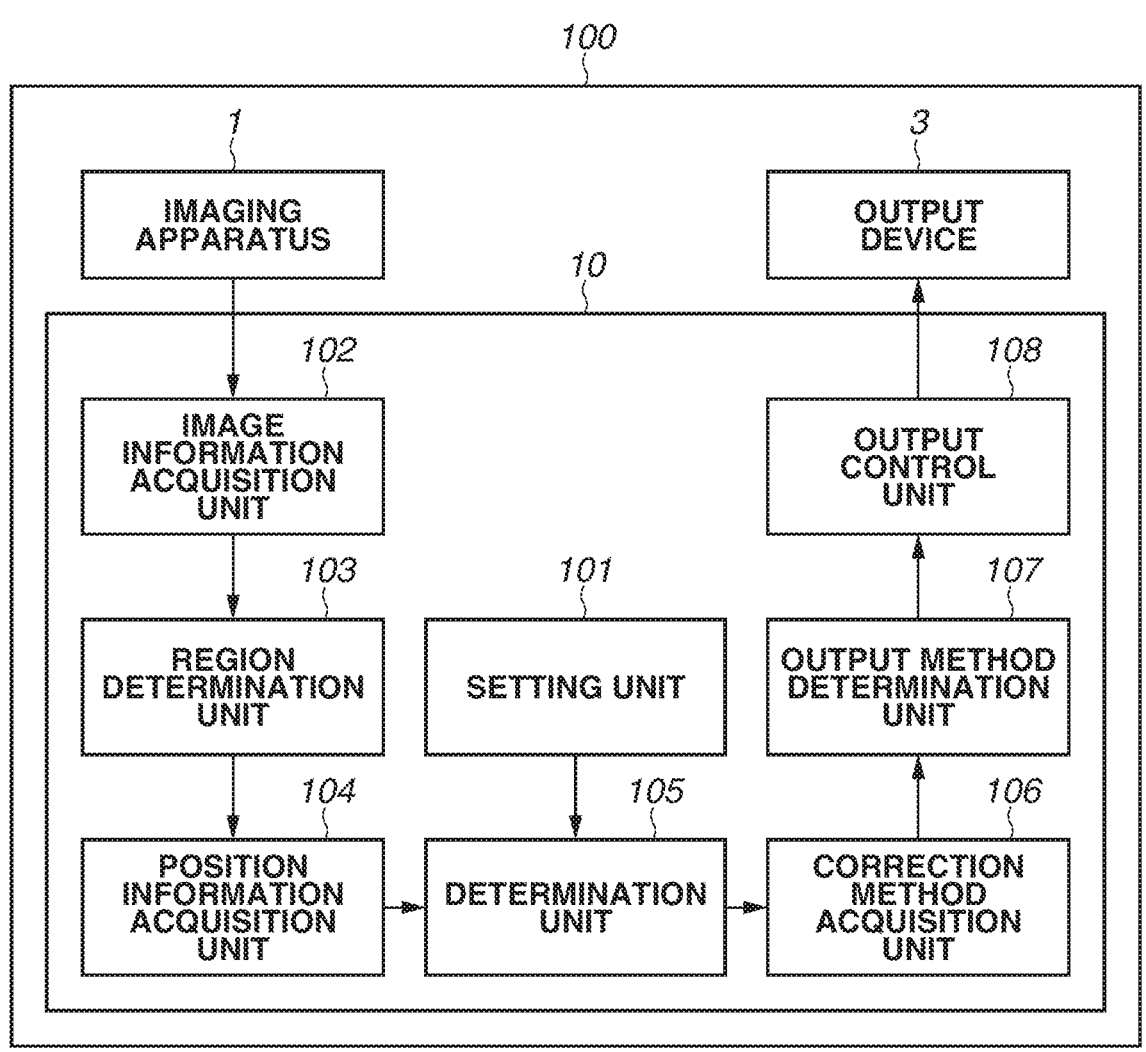
FIG. 2 is a block diagram illustrating a functional configuration example of the information processing system.

FIG. 2 is a functional block diagram of the information processing system 100 and the information processing apparatus 10. The information processing apparatus 10 includes a setting unit 101, an image information acquisition unit 102, a region determination unit 103, a position information acquisition unit 104, a determination unit 105, a correction method acquisition unit 106, an output method determination unit 107, and an output control unit 108.

The setting unit 101 sets a determination condition to be used in an inspection performed by the information processing system 100. The determination condition is whether the position of a part of a target object falls within a predetermined range. Alternatively, the determination condition may be whether the orientation of a part of a target object (six-dimensional information including a three-dimensional position in X, Y, and Z directions, and rotational directions respectively corresponding thereto) falls within a predetermined range. The determination condition varies depending on the type of the inspection or the target object. A setting method for the determination condition will be described below. The setting unit 101 transmits the set determination condition to the determination unit 105.

The image information acquisition unit 102 acquires image information (distance image) output from the imaging apparatus 1. The image information is distance information indicating a distance from the imaging apparatus 1 to the target object 4. The distance information corresponds to each pixel in the distance image. The image information acquisition unit 102 outputs the acquired image information to the region determination unit 103. The image information acquisition unit 102 includes a capture board or a memory (random access memory (RAM)), for example.

The region determination unit 103 determines a region to be inspected, based on the image information (distance image) input by the image information acquisition unit 102. A determination method of the region will be described below. The region determination unit 103 transmits the determined region information to the position information acquisition unit 104.

Based on the image information (distance image), the position information acquisition unit 104 acquires position information of a target object in the region input from the region determination unit 103. The position information refers to at least a three-dimensional position of a part of the target object. For example, the position information includes an aggregate of three-dimensional positions on the top surface of the target object. Specifically, the position information includes an angle (slope) formed by a plane indicating the top surface of the target object and a horizontal surface. The position information also includes information regarding orientation in each coordinate axis of a three-dimensional coordinate. The position information acquisition unit 104 transmits the position information to the determination unit 105.

The determination unit 105 determines whether a part of a target object satisfies the determination condition based on the determination condition input from the setting unit 101 and the position information input from the position information acquisition unit 104. If a part of the target object satisfies the determination condition, the determination unit 105 determines the target object to be "OK", and if the part of the target object does not satisfy the determination condition, the determination unit 105 determines the target object to be "NG" (hereinafter, the determination result will be referred to as a result of inspection OK/NG). The determination unit 105 transmits the result of inspection OK/NG to the correction method acquisition unit 106. In addition, if the target object is determined to be OK, information indicating that the target object is in a desired state is output to the output device 3.

Based on the determination result input from the determination unit 105, the correction method acquisition unit 106 acquires a correction method indicating a movement amount or a direction in which the target object is to be moved for satisfying the condition for OK, if the target object is determined to be NG. An acquisition method for the correction method will be described below. The correction method acquisition unit 106 transmits the acquired correction method to the output method determination unit 107.

The output method determination unit 107 determines a method for outputting the correction method to the user based on the correction method input from the correction method acquisition unit 106. The output method determination unit 107 transmits the determined correction method output method to the output control unit 108.

The output control unit 108 presents, to the user, information regarding a difference between a current state of the target object and a desired state of the target object. The information regarding a difference between a current state of the target object and a desired state of the target object also includes information regarding the presence or absence of the target object, for example. Alternatively, the information regarding the difference may be vector information indicating how much difference lies between the current state of the target object and the desired state of the target object (position or orientation). Specifically, if the position of the target object does not satisfy a predetermined condition, based on the position information and the predetermined condition, a direction in which the state of the target object is to be changed is presented to the user. Based on the output method acquired from the output method determination unit 107, the output control unit 108 outputs instruction information to the user. If the output control unit 108 acquires the output method from the output method determination unit 107, the output control unit 108 transmits an instruction trigger to the output device 3.

Figure 3:
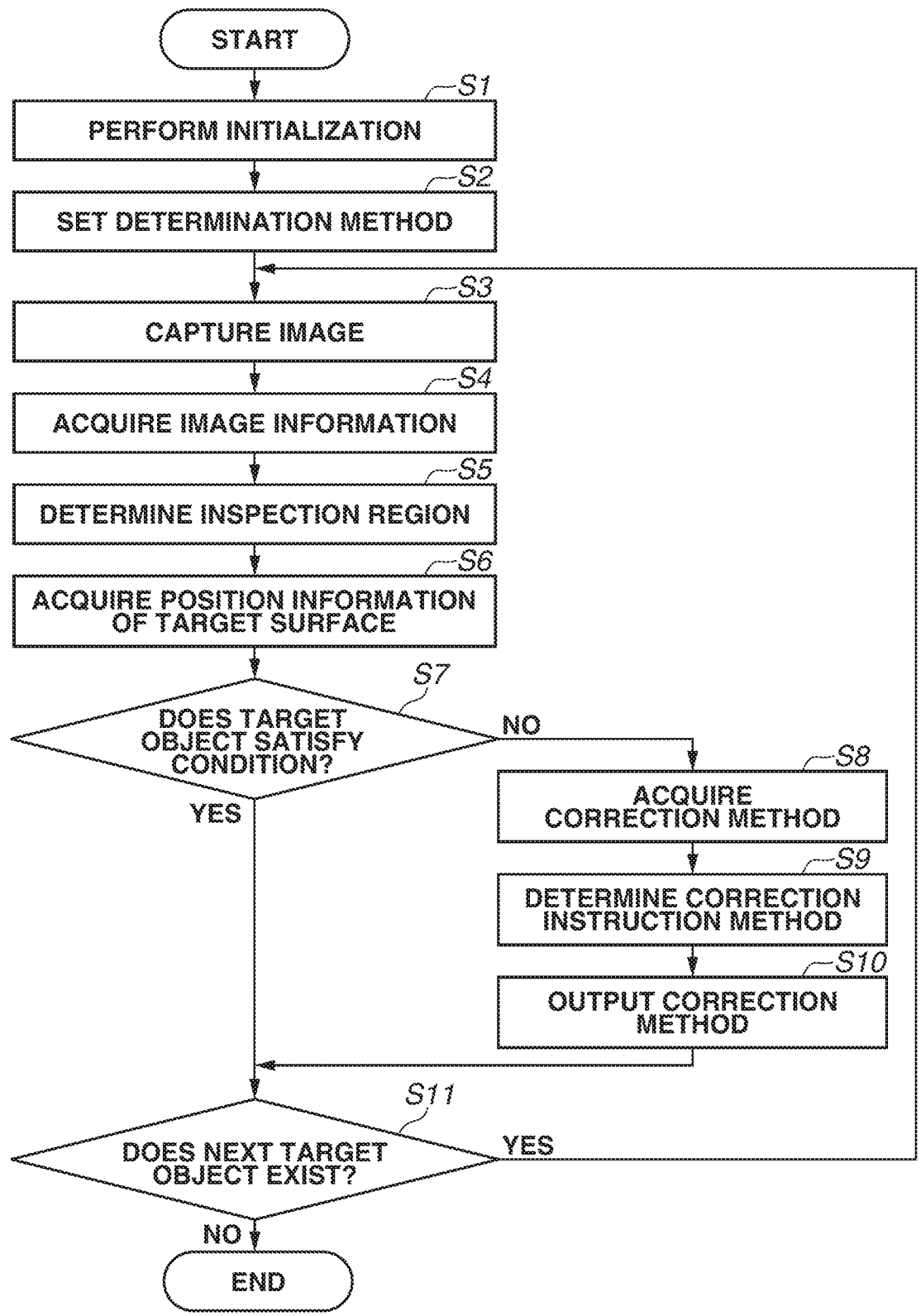
FIG. 3 is a flowchart illustrating processing executed by the information processing system.
Figure 23:
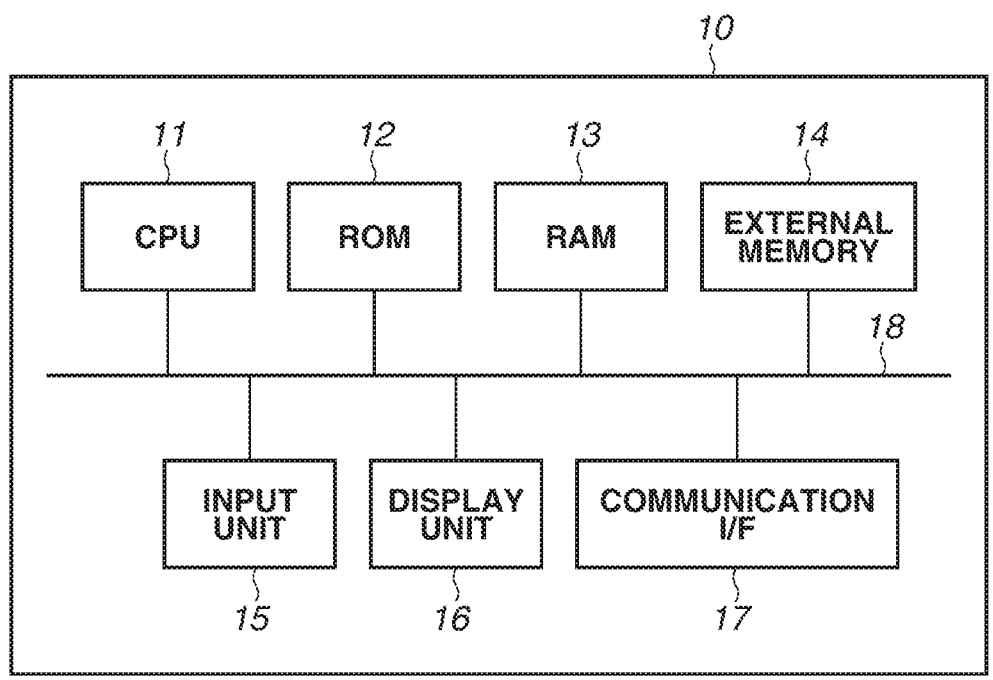
FIG. 23 is a diagram illustrating a hardware configuration example of an information processing apparatus.

FIG. 3 is a flowchart illustrating processing executed by the information processing system. The processing illustrated in FIG. 3 is implemented by a central processing unit (CPU) 11 of the information processing apparatus 10 that is illustrated in FIG. 23 reading out and executing a program stored in a read-only memory (ROM) 12 or an external memory 14. Alternatively, a part or all of the processes illustrated in FIG. 3 may be implemented by dedicated hardware. The processing illustrated in FIG. 3 is started when an operator activates the information processing system 100, for example. Nevertheless, a start timing of the processing is not limited to a timing at which the information processing system 100 is activated. In addition, the information processing system 100 needs not always perform all the operations illustrated in this flowchart.

First of all, in S1, the CPU 11 performs initialization processing of the information processing system 100. More specifically the CPU 11 loads a program stored in the ROM 12 or the external memory 14 onto a random access memory (RAM) 13 and makes the program into an executable state. In addition, the CPU 11 reads parameters of devices connected to the information processing apparatus 10, returns the devices to their default positions, and brings the devices into a usable state.

In S2, the setting unit 101 sets a determination condition for inspection OK/NG based on a model representing a state of a target object. In the case of a slanting inspection of a lid, for example, the determination condition is a condition regarding a slope of the top surface of the target object 4 (slope allowable range). In addition, the model represents a desired state of the target object. Specifically, the model is a model representing the state of the surface of the lid using an equation of a plane. The model is held in a storage unit (not illustrated) of the information processing apparatus. Alternatively, the information processing apparatus acquires the model from an external device via a communication unit (not illustrated). When the slanting of the lid of the target object 4 is desired to be checked, if the lid of the target object 4 is in a state of being rotated about a predetermined axis, the slanting can be checked by inspecting the slope of a partial region of the lid. When the imaging apparatus 1 is installed to squarely face the surface on which the target object 4 is placed, if the surface of the lid of the target object 4 is not slanting, the imaging apparatus 1 squarely faces the surface of the lid of the target object 4 as well. Thus, if the lid of the target object 4 does not squarely face the imaging apparatus 1, it is considered that the lid is inclined, that is to say, the lid is slanting. The state of the surface of the lid that is determined to be correct in the inspection is substituted with the model represented by the equation of the plane, and the slope of the surface is defined as follows. By an equation of a plane in Equation (1), a normal unit vector of a target plane is obtained as in Equation (2).

$$Ax + By + Cz + D = 0 \tag{1}$$

[Math. 1]

$$n = \frac{(A, B, C)}{\sqrt{(A^2 + B^2 + C^2)}} = (n_x, n_y, n_z) \tag{2}$$

Figure 4A:
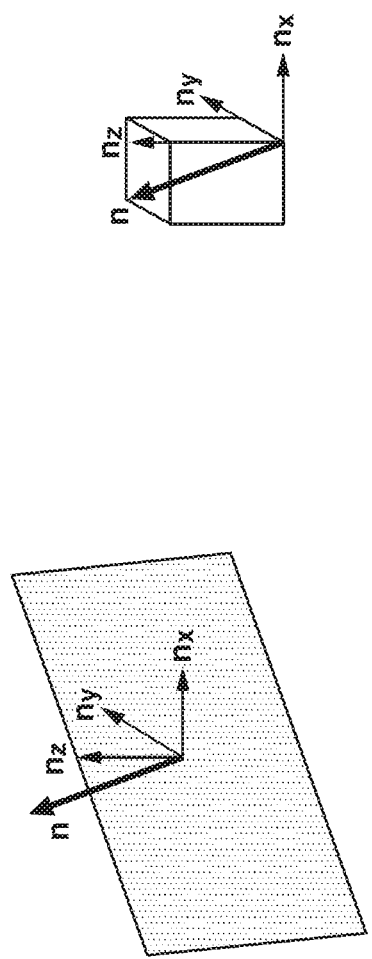
FIGS. 4A and 4B are diagrams illustrating a slope of a plane formed by a target object.
Figure 4B:
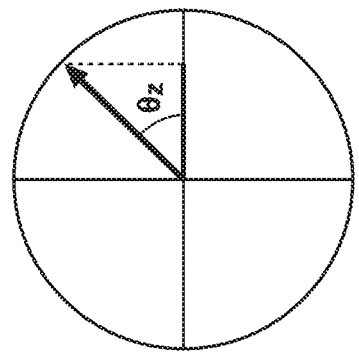
Figure 4B:
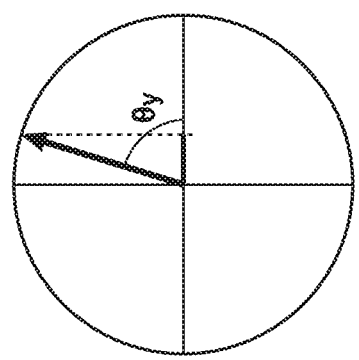
Figure 4B:
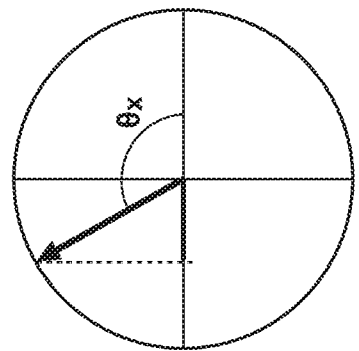

In the equation, $n_x$, $n_y$, and $n_z$ respectively denote fundamental vectors in the X, Y, and Z directions as illustrated in FIGS. 4A and 4B. Based on Equation (2), angles θ formed by the normal unit vector and the respective fundamental vectors $n_x$, $n_y$, and $n_z$ are defined as slopes as in the following Equations (3) to (5).

$$\theta x = 180 \cos^{-1} n_x / \pi \tag{3}$$

$$\theta y = 180 \cos^{-1} n_y / \pi \tag{4}$$

$$\theta z = 180 \cos^{-1} n_z / \pi \tag{5}$$

Thus, if the lid of the target object 4 squarely faces an optical axis of the camera (closed or not slanting), the observed plane has the following slopes in the X, Y, and Z directions with respect to the optical axis of the camera.

$$\theta x = 90° \tag{6}$$

$$\theta y = 90° \tag{7}$$

$$\theta z = 0° \tag{8}$$

If the target object 4 is determined to be inspection OK when the angle falls within ±3° in each direction in an inspection, ranges determined to be OK are set as follows.

$$87.00° \leq \theta x \leq 93.00° \quad (9)$$

$$87.00° \leq \theta y \leq 93.00° \quad (10)$$

$$-3.00° \leq \theta z \leq 3.00° \quad (11)$$

In S3, the imaging apparatus 1 captures an image of the target object 4. The imaging apparatus 1 captures an image in such a manner that the target object 4 is included in the image. The imaging apparatus 1 may release a shutter at a fixed time interval. The imaging apparatus 1 may capture a video of the target object 4.

In S4, the image information acquisition unit 102 acquires image information of the target object 4 that is output by the imaging apparatus 1, and transmits the acquired image information to the region determination unit 103.

In S5, the region determination unit 103 determines an inspection region based on the image information (distance image) input by the image information acquisition unit 102. As a method for determining a region, for example, the user may preset a region or may set a region based on the acquired image information.

Figure 5A:
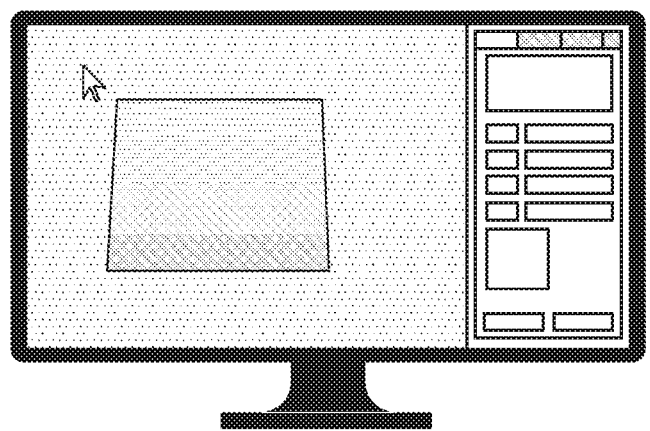
FIGS. 5A, 5B, and 5C are diagrams illustrating an example of setting a region to be inspected.
Figure 5B:
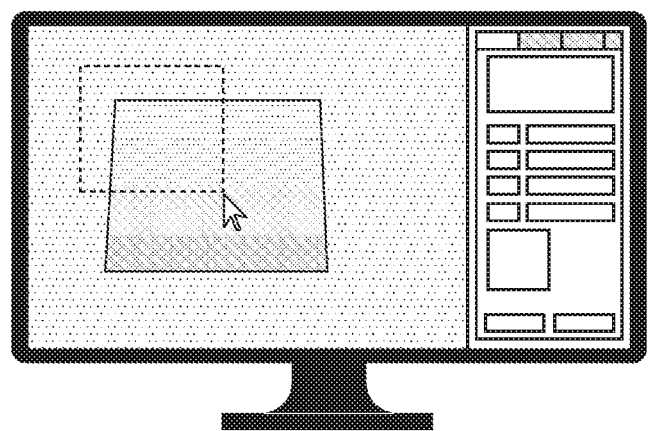
Figure 5C:
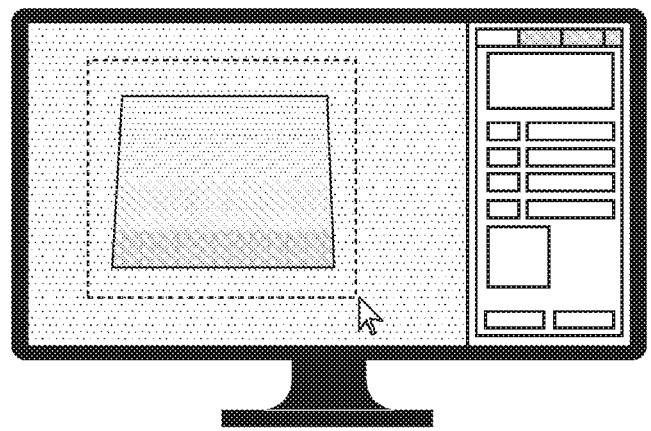

As a method for presetting a region by the user, an image of the target object 4 is captured off-line in a positional relationship similar to that in an online state, and the captured image is used. For example, as illustrated in FIGS. 5A, 5B, and 5C, a region is determined by the user dragging a mouse cursor in a two-dimensional image of the target object 4. Alternatively, a region may be determined by inputting coordinate values of a top left corner point and a bottom right corner point of the region set as illustrated in FIGS. 5A, 5B, and 5C.

Figure 6A:
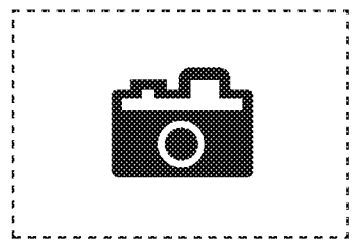
FIGS. 6A, 6B, and 6C are diagrams illustrating an example of setting a region using template matching.
Figure 6B:
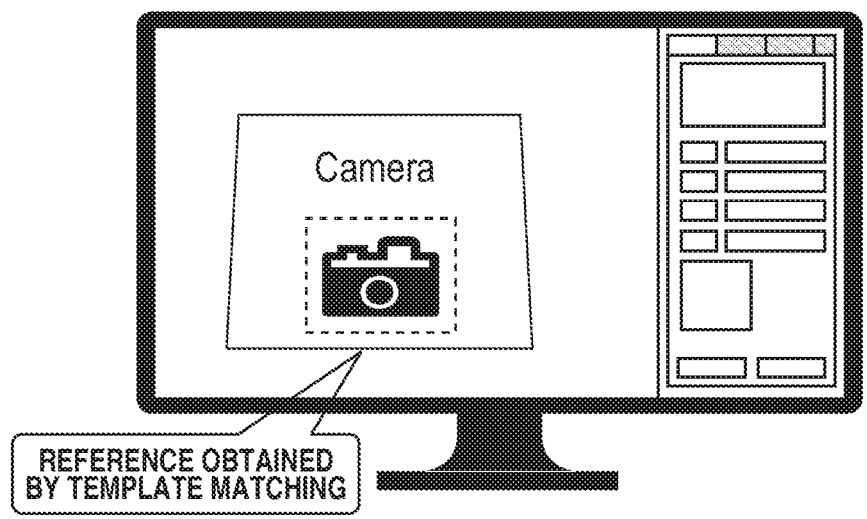
Figure 6C:
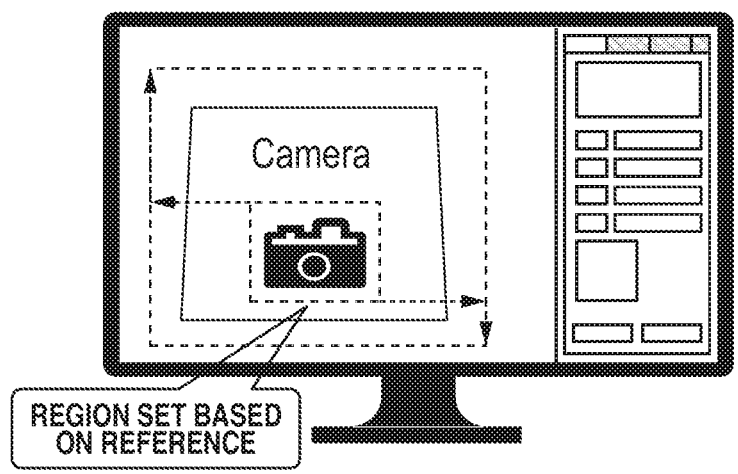

As a method for setting a region based on acquired image information, for example, template matching is performed using two-dimensional image information. A mark indicating a camera is prepared as a template as illustrated in FIGS. 6A, 6B, and 6C, and if template matching of the mark of the camera is performed during runtime, a predetermined region that is based on the position is set as an inspection region. By presetting the predetermined region, even if the position of the target object 4 changes, the same region of the target object 4 can be set as an inspection region.

A region may be set in a color image or a distance image. Because positions in the color image and the distance image are aligned, if a region is set in one image, a region is also set at the same position in the other image.

In S6, the position information acquisition unit 104 acquires position information indicating at least a position of a target surface of the target object. If the imaging apparatus can measure a distance, the position information is information indicating a three-dimensional position of the surface of the target object in an image coordinate system. If the target object is placed in a correct up-down direction, a distance from the imaging apparatus (a sensor included therein) to the top surface of the target object is measured. For example, a plane is obtained for the region set in S5, and the slope of the obtained plane is acquired. Specifically, first of all, the distance image information acquired in S4 is converted into a three-dimensional point group in a camera coordinate system using a camera parameter. Because a three-dimensional point group to be observed normally includes observation noise, by robust estimation such as Random Sample Consensus (RANSAC), plane fitting is performed using a part of points in the region and not being noise. For noise removal, aside from the robust estimation, dilation/erosion processing may be performed or a filter such as a bilateral filter may be used. By making parameters such as the number of repetitions of RANSAC to be used in the robust estimation and thresholds of a range regarded as an outlier arbitrarily-settable by the user, it is possible to shorten a processing time taken when resolution is high and many point groups are included.

In S7, the determination unit 105 determines whether the target object satisfies the determination condition based on the determination condition input from the setting unit 101 and the position information input from the position information acquisition unit 104. The determination unit 105 determines whether the result of the position and orientation that has been acquired in S6 falls within the OK range of the determination condition set in S2. Specifically, the determination unit 105 performs the determination based on whether the respective values of θx, θy, and θz that have been acquired in S6 fall within the ranges set in S2. If the values do not fall within the ranges (NO in S7), the determination unit 105 determines the target object to be NG, and the processing proceeds to S8. If the values fall within the ranges (YES in S7), the determination unit 105 determines the target object to be OK, and the processing proceeds to S11. If the target object satisfies the determination condition, the output control unit 108 controls the output device 3 to output information indicating that the current state of the target object satisfies a desired state.

Figure 7A:
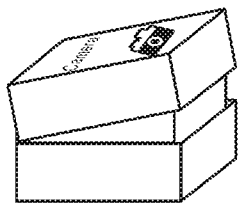
FIGS. 7A, 7B, and 7C are diagrams illustrating a state observed in an inspection of a target object.
Figure 7B:
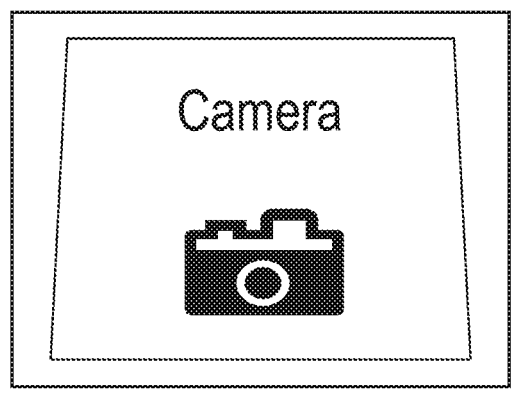
Figure 7C:
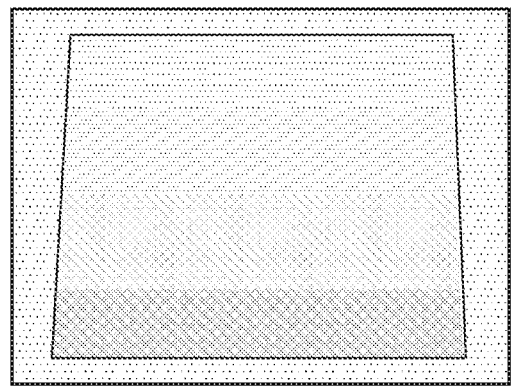
Figure 8A:
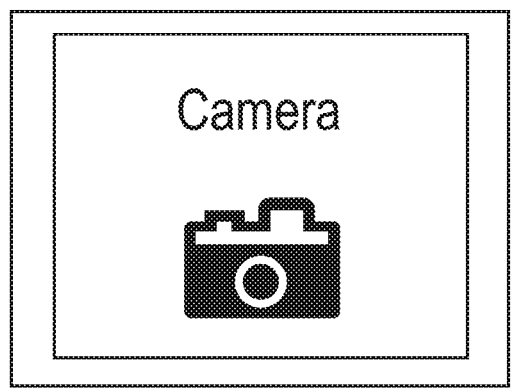
FIGS. 8A and 8B are diagrams illustrating a desired state of a target object.
Figure 8B:
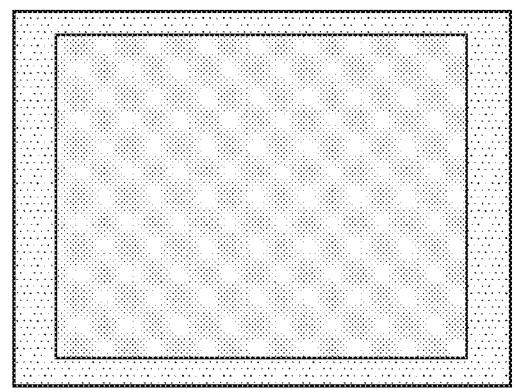

In S8, the correction method acquisition unit 106 acquires a correction method indicating a movement amount or a direction in which the target object is to be moved for satisfying the predetermined condition, if the state (position or orientation) of the target object does not satisfy the predetermined condition based on the determination result input from the determination unit 105. The acquisition is performed for correcting the current state (position or orientation) of the target object that has been determined by the determination unit 105 not to satisfy the condition, to a predetermined state (position or orientation) satisfying the condition set in S2. For example, a case where the lid is slanting as illustrated in FIG. 7A is considered as a current state of the target object. At this time, as a method for checking the slanting of the target object, presenting a distance image on a screen is useful because the degree of the slope can be visually recognized. The distance image is illustrated in FIGS. 7B and 7C. As a presentation method for a distance image, in accordance with distance values of the respective pixels, pixels provided on the front side (close to the camera) are displayed in black (displayed with dark patterns), and pixels provided on the rear side (far from the camera) are displayed in white (displayed with pale-colored patterns). Alternatively, front-side pixels may be displayed in white and rear-side pixels may be displayed in black, or distance values may be converted into a color map and the color map may be displayed. According to the determination condition set in S2, a desired state determined to be inspection OK is a state as illustrated in FIGS. 8A and 8B. At this time, the desired state corresponds to an intermediate value of the values set as the determination condition. For example, if the ranges set in S2 are the ranges represented by Inequalities (9) to (11), the values represented by Equations (6) to (8), which are median values thereof, are regarded as values in the desired state which indicate the corrected position and orientation.

Figure 9:
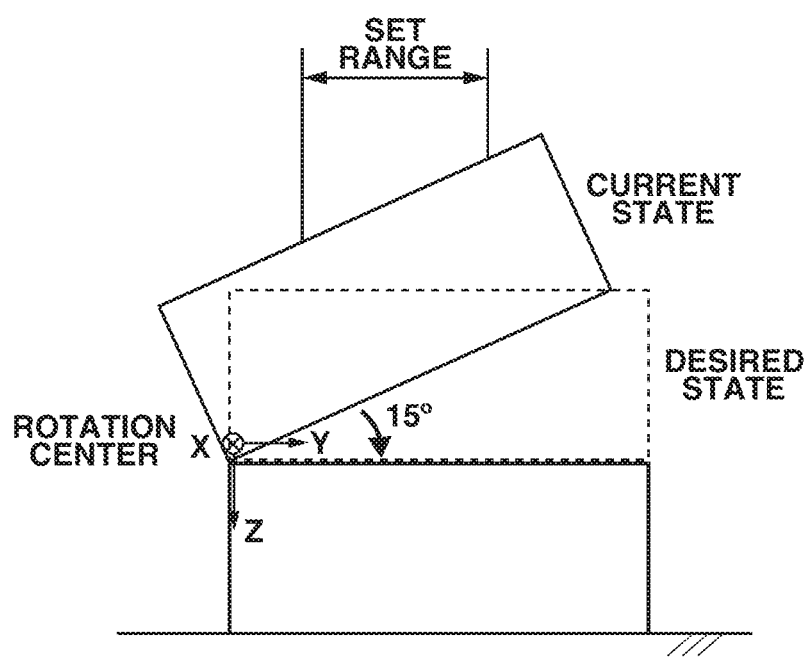
FIG. 9 is a diagram illustrating a difference between a desired state of a target object and a state observed in an inspection.

If the desired state is set, a difference between the desired state and the current position and orientation is obtained, and how the position and orientation are to be changed for changing the current state to the desired state is obtained. For example, if the current state is a state as illustrated in FIG. 9, for changing the surface in the set range to the desired state, the target object needs to be rotated by +15° with respect to the X axis direction being a rotation center illustrated in FIG. 9.

In S9, the output method determination unit 107 determines a method for outputting the correction method to the user based on the correction method input from the correction method acquisition unit 106. For example, the output method determination unit 107 determines to display the correction method on a display (display device). Alternatively, the output method determination unit 107 may determine to output the correction method using a speaker (voice device), a projector (projection device), an HMD, or an AR glasses.

An output method for the correction method may be preset. For example, a correspondence relationship between the position of the user and an output method may be preset. When the processing in the flowchart is executed, the information processing apparatus may determine an output method based on the position of the user. For example, an output method is set in accordance with a status such as the position of the user or a noise level of a factory. Specifically, when a distance between the user and a display falls within a predetermined range (e.g., within 3 m), the correction method is output to the display, and when a distance between the user and the display falls outside the predetermined range (over 3 m), the correction method is output by voice. For example, if it can be seen that the user does not exist in front of the display, using a camera attached to the display, instruction information (correction method) is output by another unit such as a speaker without displaying the instruction information on the display. Alternatively, if it can be seen that the user is looking at the target object, instruction information is output by projecting the instruction information onto the target object using a projector. Alternatively, if ambient sound is noisy (a measurement result of sound volume exceeds a predetermined threshold), instruction information may be presented by being displayed on the display, instead of performing a voice instruction. In addition, if a plurality of output devices is connected, instruction information may be presented in combination. For example, if a display device and a voice device are used as output devices, instruction information is output by the two devices.

Figure 10A:
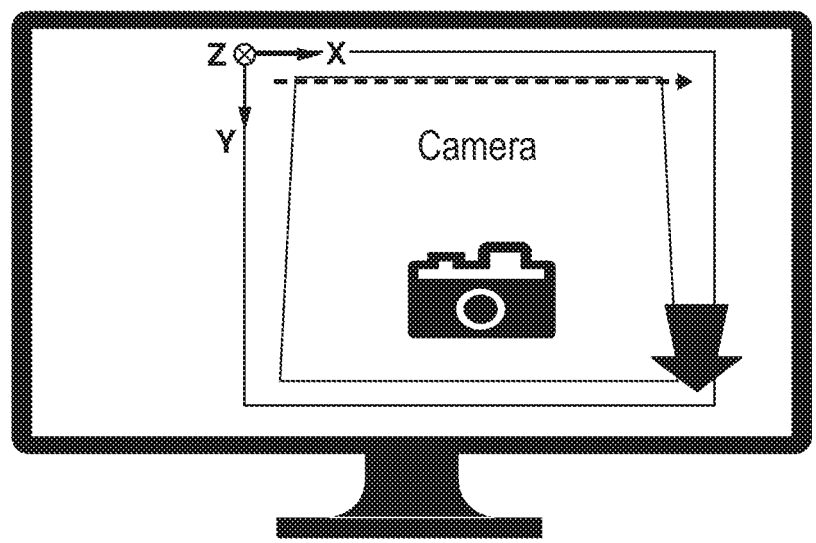
FIGS. 10A and 10B are diagrams illustrating an example of a presentation method to a user.
Figure 10B:
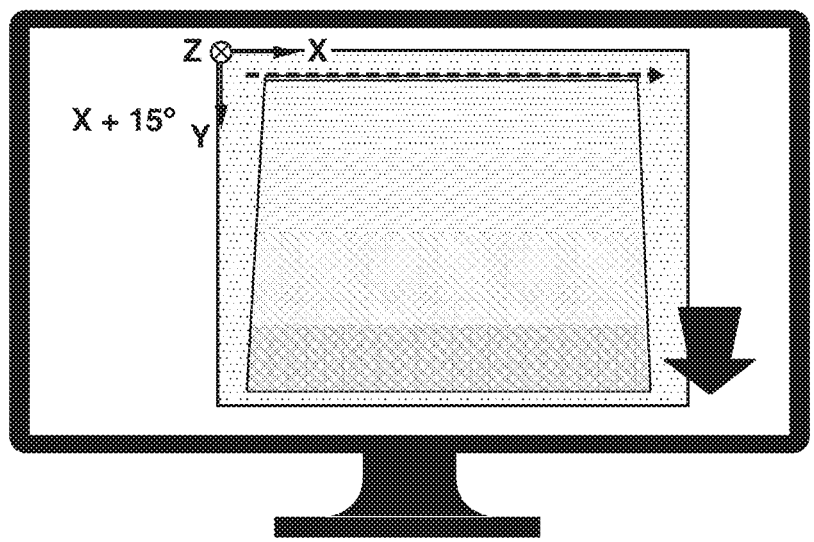

In S10, the output control unit 108 presents information regarding a difference between a current state of the target object and a desired state of the target object to the user. For example, the information is information indicating a direction or an amount for changing the current state of the target object to the desired state of the target object that is obtained from vector information. For example, if it is determined in S9 that an instruction is to be performed using a display, based on the result acquired in S8, a direction in which or an amount by which the target object is to be moved is displayed on a display device. For example, as illustrated in FIGS. 10A and 10B, by indicating a rotation axis extending in the X direction, and indicating a direction using an arrow and indicating an angle using a numerical value, an instruction is performed in such a manner that the target object is rotated about the rotation axis by +15°. Displaying an amount by which the target object is to be moved, using a numerical value or an angle helps the user to determine whether a subsequent correction operation is required, by checking an output result, if a difference from the desired state falls within an allowable range and is about several millimeters, for example. When an instruction is performed, for example, the instruction may be displayed by being superimposed on a two-dimensional image as illustrated in FIG. 10A, or the instruction may be displayed by being superimposed on a distance image as illustrated in FIG. 10B. Alternatively, aside from the diagram viewed from above, positions in a three-dimensional point group and two-dimensional color image information may be aligned, an image viewed from an arbitrary viewpoint may be generated using colored three-dimensional point group information, and a correction method may be displayed in a superimposed manner. Alternatively, if it is determined in S9 that a correction method is to be output by another method, a correction instruction is output to the user in accordance with the determined method. If the user is to be instructed by voice using a speaker, the instruction illustrated in FIGS. 10A and 10B is conveyed to the user by voice. For example, the user is instructed to rotate the top surface of the box with respect to the X axis direction by +15°. Alternatively, the instruction similar to the instruction conveyed in the case of using the display is conveyed if the user is instructed by projection using a projector by projecting the instruction illustrated in FIGS. 10A and 10B onto the target object. Alternatively, if the user is instructed using an HMD or an AR glasses, the instruction similar to the instruction conveyed in the case of using the display is conveyed by displaying the instruction illustrated in FIGS. 10A and 10B being superimposed on the target object in a virtual space or a real space using the HMD or the AR glasses. The instruction information may be an absolute value or vector information that indicates a difference between a current state of the target object and a desired state of the target object. In this case, it is only required to present position information of the target object as instruction information.

In S11, the CPU 11 determines whether the next target object 4 exists. Then, if the next target object 4 does not exist (NO in S11), the CPU 11 determines to end the processing and ends the processing illustrated in FIG. 3. If the next target object 4 exists (YES in S11), the CPU 11 determines to continue the processing and the processing returns to S3. As a determination method, for example, the presence or absence of the target object 4 may be determined based on the image information of the target object 4 that has been acquired in S4, or the presence or absence of the target object 4 may be determined based on whether the number of processes has reached the preset number of processes. Alternatively, a sensor may be provided at a supply location of the target object 4, and the presence or absence of the target object 4 may be determined based on the sensor information. As the sensor information, for example, a weight sensor may be provided at the supply location and the presence or absence of the target object 4 may be determined based on the weight measured at the supply location. Alternatively, the presence or absence of the target object 4 may be determined by a method other than these.

Aside from setting an absolute condition using a model representing the shape of a target object, the setting unit 101 may set a relative condition using an image of a plurality of target objects. The absolute condition is a range (threshold) of a specific numerical value such as a slope or a rotation amount. In contrast to this, the relative condition uses an average value of position information of inspected target objects, for example. If a difference between position information of a certain target object and the average value is larger than a predetermined value, the target object is detected to be in an abnormal state.

Among the above-described processing units, a correction method may be acquired using the learned model obtained by machine learning in place of the correction method acquisition unit 106. In this case, for example, a plurality of combinations of input data to the processing unit and output data is prepared as learning data, knowledge is acquired from these combinations by machine learning, and a learned model of outputting, as a result, output data corresponding to input data based on the acquired knowledge is generated. For example, a neural network model can be used as the learned model. Then, the learned model performs the processing of the processing unit as a program for performing processing equivalent to the processing unit by operating in cooperation with a CPU or a graphics processing unit (GPU). The above-described learned model may be updated, as necessary, after predetermined processing.

As described above, in the present exemplary embodiment, after a determination condition for determining inspection OK/NG is set, image information of a target object is acquired by an imaging apparatus. Subsequently, an inspection region is determined based on the image information, a position and orientation of the target surface are acquired, and OK/NG determination is performed based on the determination condition. Then, if the target surface is determined to be NG, a method for correcting the target surface so as to be determined to be OK is acquired, an output method for the correction method is determined, and an instruction for the correction method is output to the user.

With this configuration, even a user unaccustomed to an inspection of a corresponding process can recognize a method for correction to be performed when an inspection result indicates NG. Thus, a defective product can be easily corrected to an appropriate state.

Next, a second exemplary embodiment will be described. In the second exemplary embodiment, the description will be given of a method for obtaining a position and orientation in which an imaging apparatus is installed, as a presetting to be performed before an inspection. For obtaining the position and orientation, statistical information of distances is acquired. By acquiring distance statistical information and a slope of a plane as position and orientation of a target surface, and performing OK/NG determination based on a determination condition, it is determined whether the target surface is installed to squarely face the imaging apparatus 1. If the target surface is determined to be NG, a method for correcting the orientation of the imaging apparatus is acquired, an output method for the correction method is determined, and the correction method is output. With this configuration, the imaging apparatus 1 can be easily installed to squarely face the target surface. It is therefore possible to shorten a time taken for presetting of an information processing system.

Figure 11:
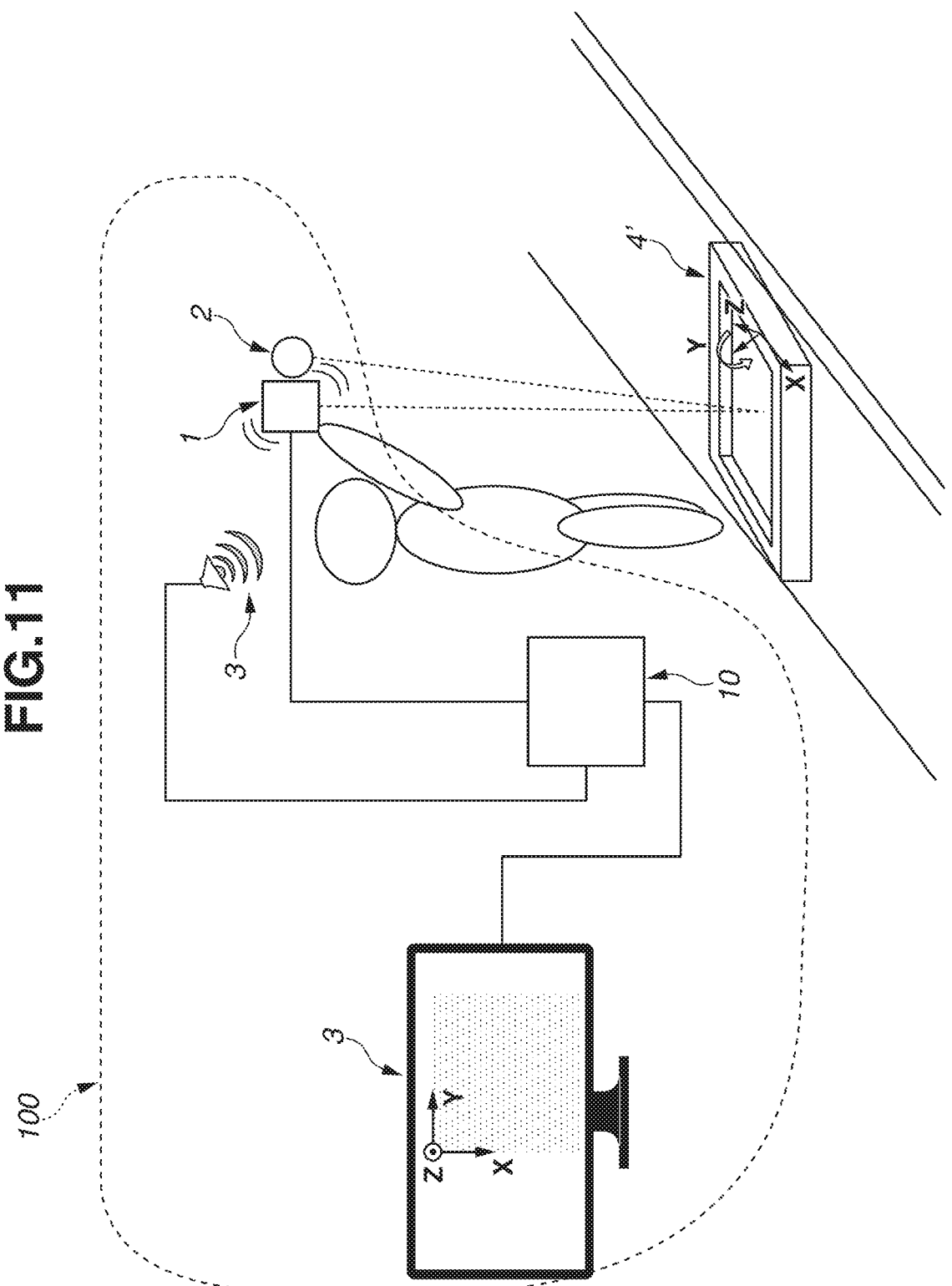
FIG. 11 is a diagram illustrating a configuration example of an information processing system.

FIG. 11 is a diagram illustrating a configuration example of an information processing system 100' including an information processing apparatus 10' according to the present exemplary embodiment. FIG. 11 illustrates an example of a device configuration, and is not intended to limit the scope of every embodiment.

A target object 4' is an object such as a tray flowing on a belt conveyor to be inspected by the information processing system 100'. An inspection refers to determining whether the tray is installed to squarely face the imaging apparatus 1, by measuring a position and orientation of a tray top surface, for example. In the present exemplary embodiment, the target object 4' also includes the belt conveyor that conveys the tray. In this case, a belt conveyor top surface is inspected as a target surface. Alternatively, the target object 4' may be a component placed on the tray. In this case, a component top surface is inspected as a target surface.

Figure 12:
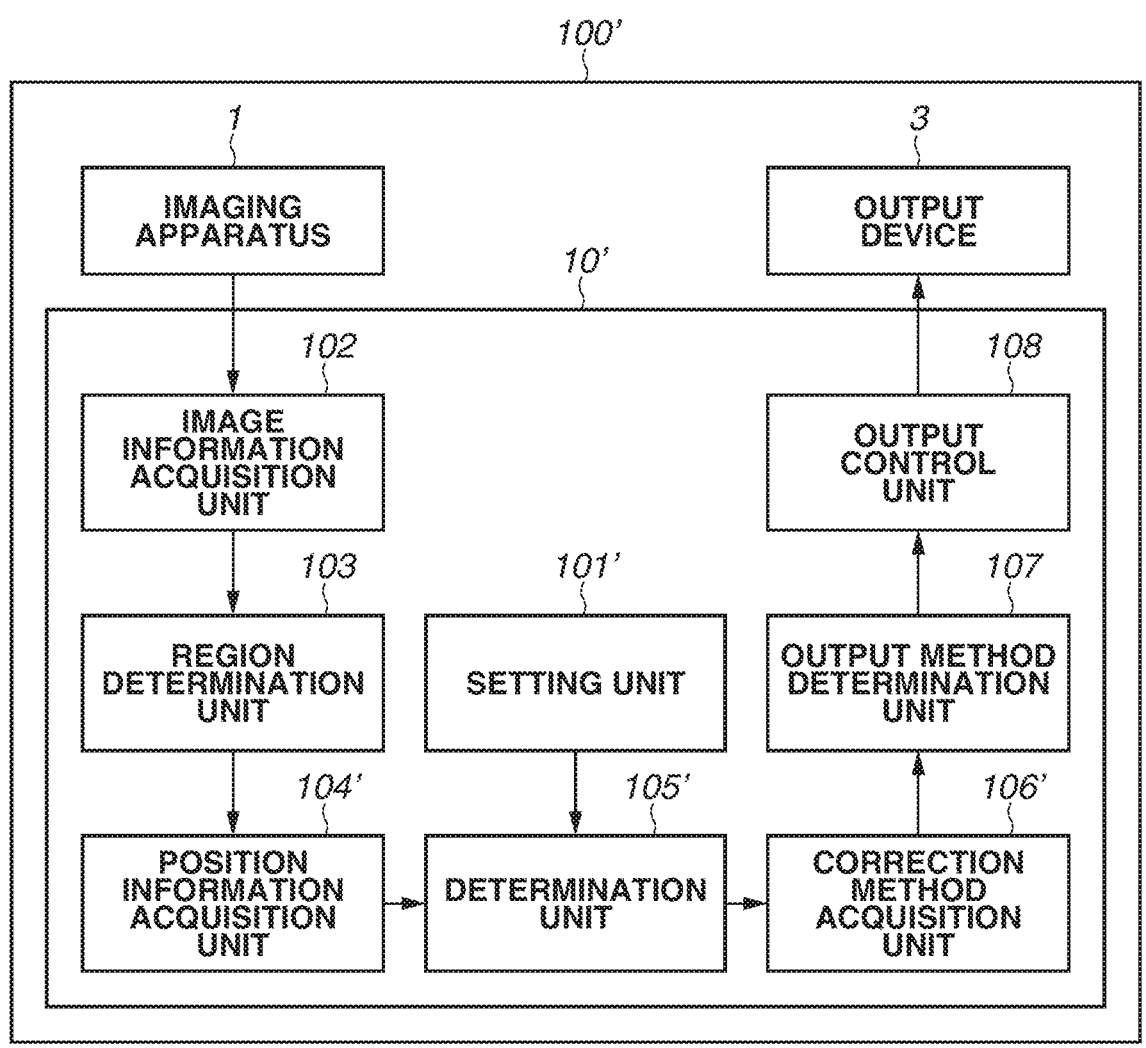
FIG. 12 is a block diagram illustrating a functional configuration example of the information processing system.

FIG. 12 is a functional block diagram of the information processing system 100' and the information processing apparatus 10' according to the present exemplary embodiment. The information processing system 100' and the information processing apparatus 10' illustrated in FIG. 12 differ from the information processing system 100 and the information processing apparatus 10 illustrated in FIG. 2 in processing to be performed by the setting unit 101, the position information acquisition unit 104, the determination unit 105, and the correction method acquisition unit 106.

Based on distance statistical information, a setting unit 101' sets a determination condition for inspection OK/NG to be determined by the information processing system 100'. The setting unit 101' transmits the set determination condition to a determination unit 105'. While a slope is set as a determination condition in the first exemplary embodiment, in the present exemplary embodiment, at least one of the maximum value of a distance, the minimum value of a distance, a difference between the maximum and minimum values of a distance, an average value of distances, a deviation of distances, or a median value of distances is set as a determination condition as distance statistical information.

A position information acquisition unit 104' acquires a position and orientation in a region input from the region determination unit 103. The position information acquisition unit 104' transmits the position information to the determination unit 105'. While the slope of the surface is acquired in the first exemplary embodiment, in the present exemplary embodiment, distance statistical information of the surface is also acquired. In the present exemplary embodiment, by using a median value and a deviation of distances as distance statistical information, it is determined whether the target surface is not inclined, that is to say, whether the target surface squarely faces the camera, based on whether the target surface is at a desired distance, and the height of the surface has small variations.

Based on the determination condition input from the setting unit 101' and the position information input from the position information acquisition unit 104', the determination unit 105' determines inspection OK/NG. The determination unit 105' transmits a result of inspection OK/NG to a correction method acquisition unit 106'. While the determination is performed based on the slope of the surface in the first exemplary embodiment, in the present exemplary embodiment, the determination is performed based on the slope of the surface and the distance statistical information.

Based on the determination result input from the determination unit 105', the correction method acquisition unit 106' acquires a method for correcting the target surface to an OK state, if the target surface is determined to be NG. The correction method acquisition unit 106' transmits the acquired correction method to the output method determination unit 107. While the correction method for correcting the slope of the surface was determined in the first exemplary embodiment, in the present exemplary embodiment, the correction method for correcting the slope of the surface of the target object and a distance to the imaging apparatus is determined.

Figure 13:
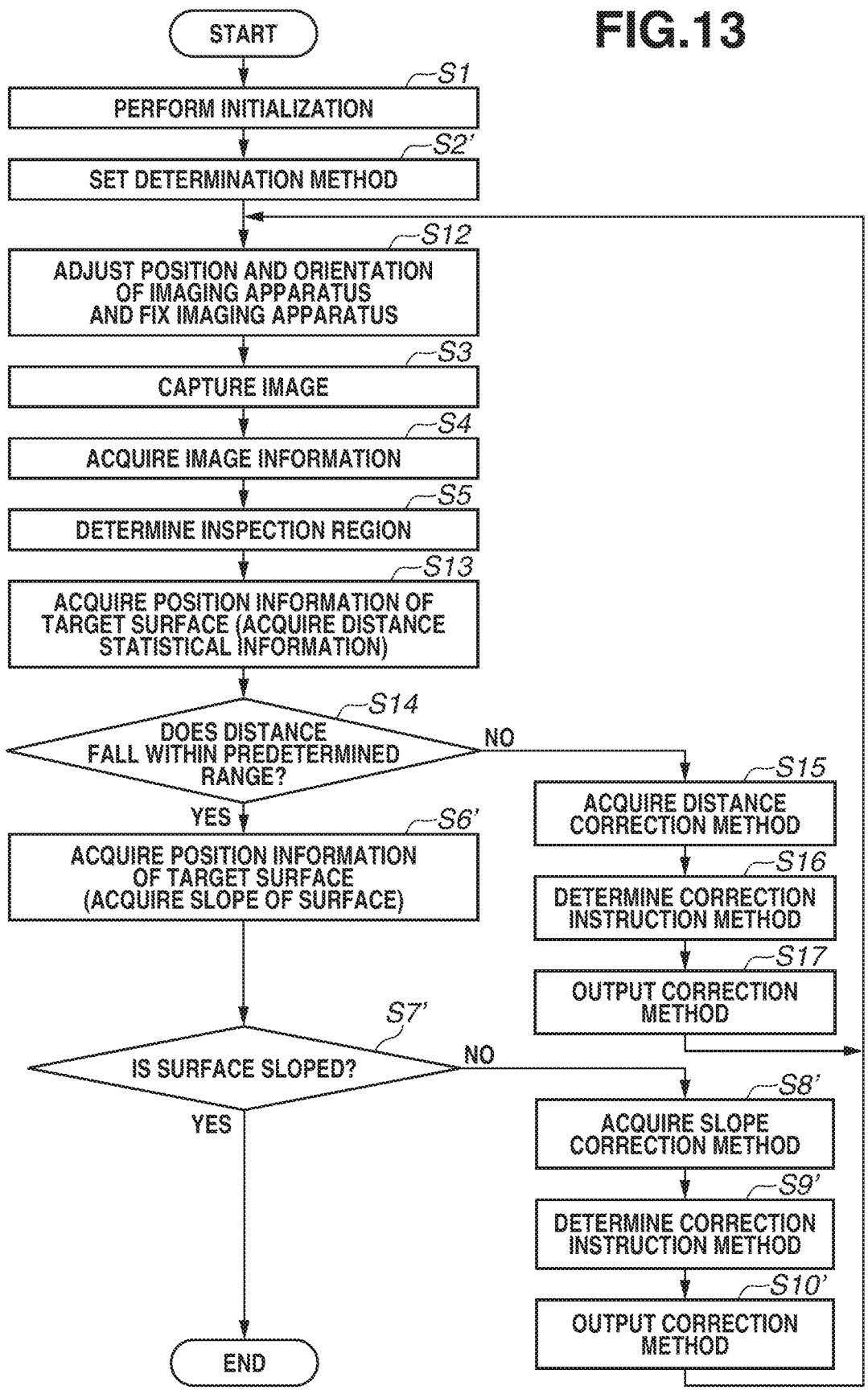
FIG. 13 is a flowchart illustrating processing executed by the information processing system.

FIG. 13 is a flowchart illustrating an inspection device control procedure executed by the information processing system 100' and the information processing apparatus 10' according to the present exemplary embodiment. Because processing differs from the processing illustrated in FIG. 3 in the first exemplary embodiment in some operations, differences will be described.

In S2', the setting unit 101' sets a determination condition for inspection OK/NG based on distance statistical information. The determination condition corresponds to statistical information of distances and the slope of the surface, for example. If it is to be checked whether the imaging apparatus 1 is installed to squarely face the target object 4', it is inspected whether the imaging apparatus 1 has a distance and a slope that fall within a predetermined range, with respect to the target surface of the target object 4'. As statistical information of distances, for example, the maximum value of a distance of an inspection region, the minimum value of the distance, a difference between the maximum and minimum values of the distance, an average value of distances, a deviation of distances, or a median value of distances is used. For example, as distance statistical information from the imaging apparatus 1 to the target surface, if it is to be inspected whether a distance median value $d_{med}$ falls within 2 mm and a distance deviation $d_{dev}$ falls within 3 mm, ranges determined to be OK are set as follows.

$$398 \text{ mm} \leq d_{med} \leq 402 \text{ mm} \quad (12)$$

$$0 \text{ mm} \leq d_{dev} \leq 3 \text{ mm} \quad (13)$$

In addition, if the slope of the surface is determined to be inspection OK when an angle falls within ±3° in each direction, the ranges represented by Inequalities (9) to (11) are set similarly to S2 in the first exemplary embodiment.

In S12, the output control unit 108 presents, to the user, a method for adjusting the position and orientation of the imaging apparatus 1 and fixing the imaging apparatus 1. In the first fixing, the user fixes the imaging apparatus 1 at a predetermined position and orientation while visually checking the target surface and the imaging apparatus 1. After that, the position and orientation of the target surface are acquired, and an inspection is performed based on distance statistical information and the slope of the surface. If correction is required, instruction information is output so as to appropriately correct the position and orientation of the imaging apparatus 1 in accordance with an instruction for the correction.

Figure 14:
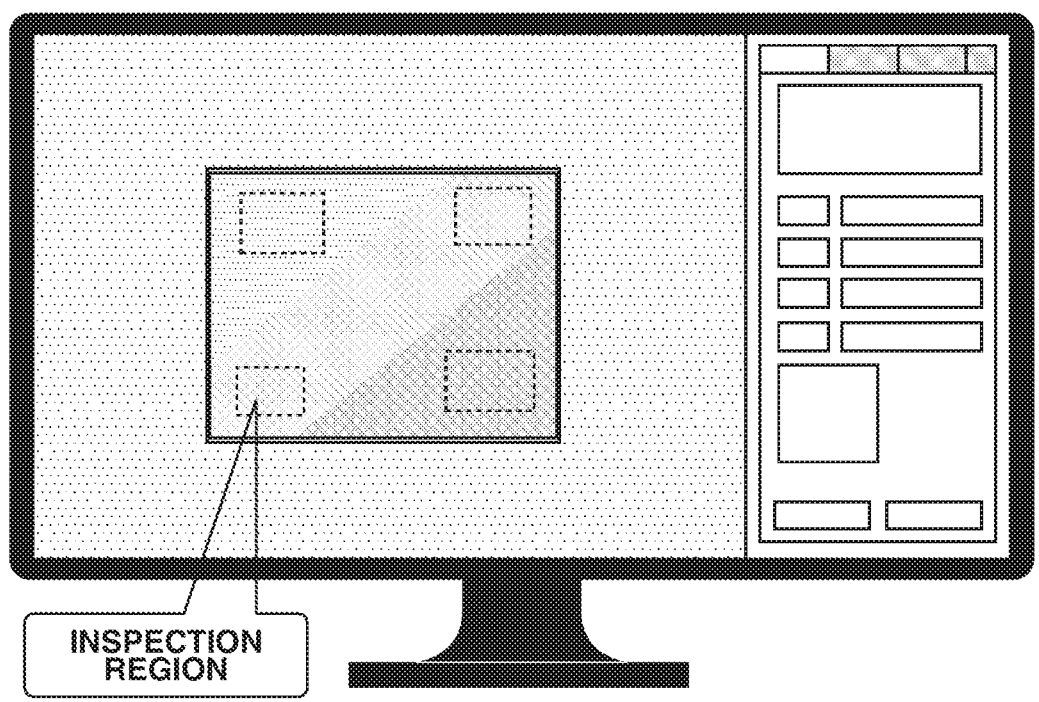
FIG. 14 is a diagram illustrating an example of a method for setting a region to be inspected.

In S13, the position information acquisition unit 104' acquires distance statistical information as position information of the target surface of the target object. For example, in a case where inspection regions are set at four corners on the tray top surface as indicated by broken-line portions illustrated in FIG. 14, distance statistical information in these regions is obtained.

In S14, the determination unit 105' performs OK/NG determination based on a predetermined condition (second condition) as to whether a positional relationship (distance) between the imaging apparatus and the target surface falls within a predetermined range. The determination unit 105' performs the determination based on whether the result acquired in S13 falls within an OK range of the determination condition set in S2'. Specifically, the determination unit 105' performs the determination based on whether the distance median value $d_{med}$ and the distance deviation $d_{dev}$ that have been acquired in S13 fall within the ranges in Inequalities (12) and (13) that have been set in S2'. If the values do not fall within the ranges (NO in S14), the target surface is determined to be NG and the processing proceeds to S15. If the values fall within the ranges (YES in S14), the target surface is determined to be OK and the processing proceeds to S6'.

Figure 15:
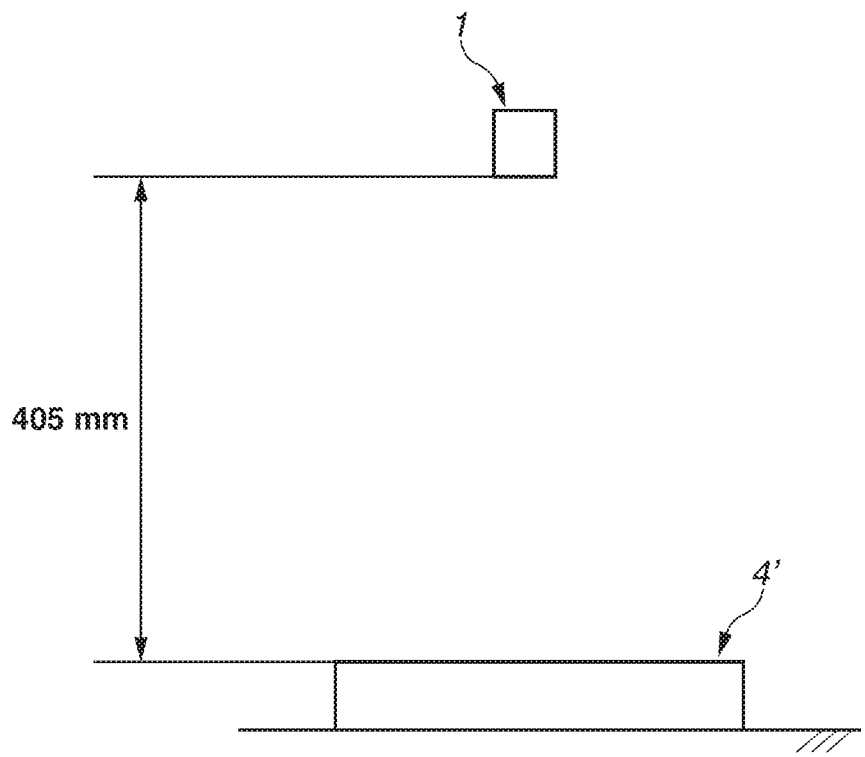
FIG. 15 is a diagram illustrating an example of a distance between an imaging apparatus and a target object.

In S15, the correction method acquisition unit 106' acquires a method for correcting the state of the imaging apparatus in such a manner that a positional relationship (distance) between the target object and the imaging apparatus satisfies the predetermined condition (second condition). Specifically, the correction method acquisition unit 106' acquires a method for changing the position or orientation of the imaging apparatus for causing the acquired distance statistical information to fall within the ranges determined to be inspection OK that have been set in S2'. For example, when a distance from the imaging apparatus 1 to the target surface is 405 mm as illustrated in FIG. 15, the imaging apparatus 1 is farther by 5 mm than a desired value 400 mm set as a determination condition. Thus, as a correction method, the imaging apparatus 1 needs to be moved closer to the target surface by 5 mm.

In S16, the output method determination unit 107 determines a method for outputting a correction method to the user. For example, the output method determination unit 107 determines to display the correction method on a display. Alternatively, the output method determination unit 107 may determine to output the correction method using a speaker, a projector, an HMD, or an AR glasses. For example, when the imaging apparatus 1 is installed to squarely face the target surface, the user is expected to look at the imaging apparatus 1 and the target object 4' without looking at the display. Thus, the correction method is presented to the user by outputting, using a speaker, a voice instruction saying that the imaging apparatus 1 is to be moved closer to the target surface by 5 mm, or projecting the instruction onto the target surface, as the result acquired in S15.

Figure 16A:
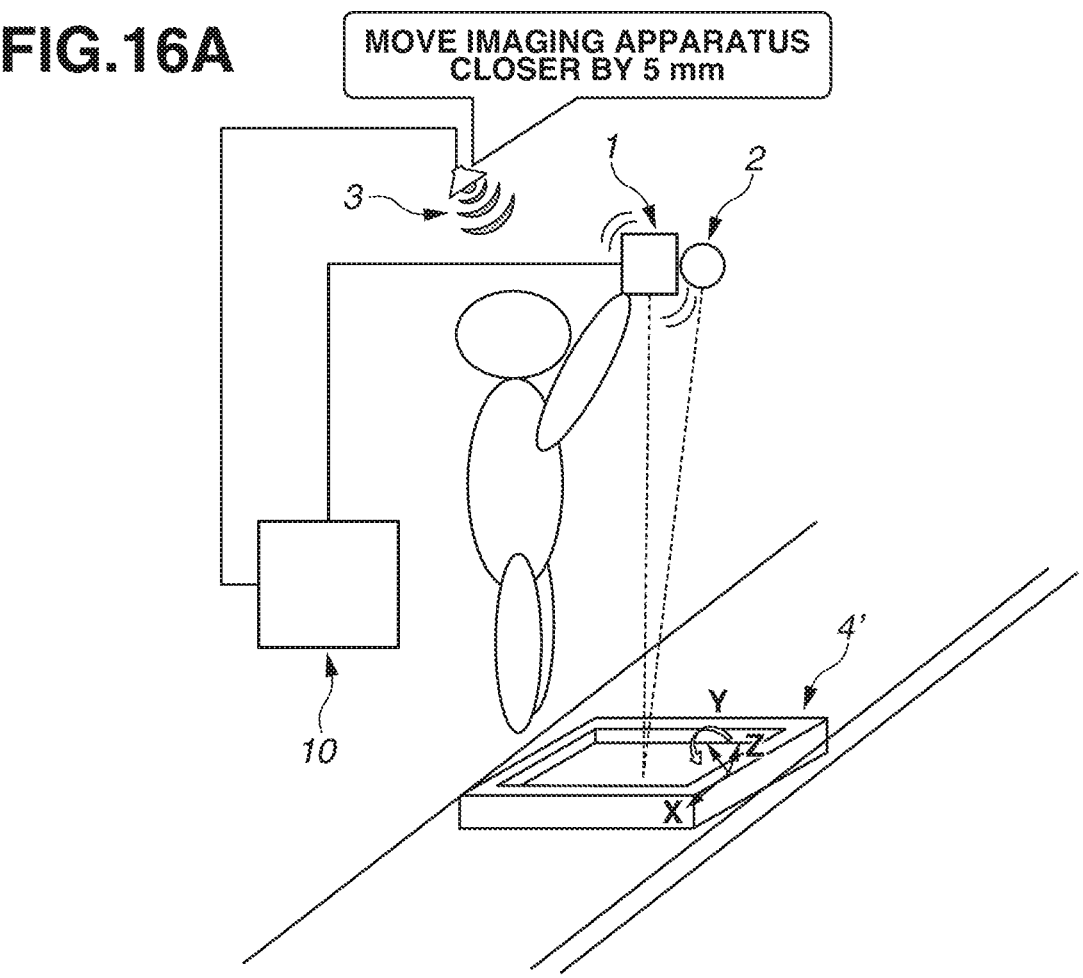
FIGS. 16A and 16B are diagrams illustrating an example of a presentation method to a user.
Figure 16B:
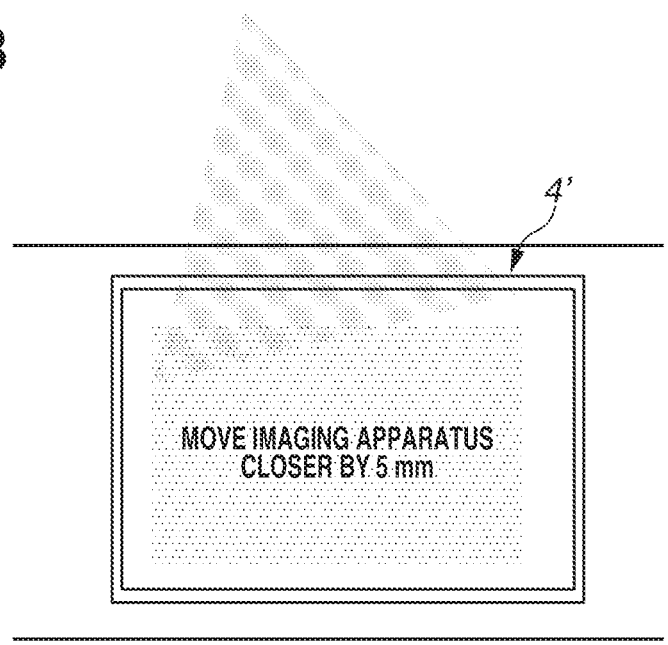

In S17, based on the second condition and the position information, the output control unit 108 presents instruction information to the user so as to correct the position or orientation of the imaging apparatus, if the position information does not satisfy the second condition. For example, the output control unit 108 may control the speaker to speak "move the imaging apparatus closer by 5 mm" as illustrated in FIG. 16A. Alternatively, the instruction saying "move the imaging apparatus closer by 5 mm" may be projected onto the target surface as illustrated in FIG. 16B.

In S6' to S10', similarly to S6 to S10 in the first exemplary embodiment, the slope of the surface is acquired and the slope is determined, and if the slope is determined to be NG, a method for correcting the slope is acquired, a method for instructing the correction is determined, and correction information is output. Nevertheless, correction instruction information for distance statistical information and correction instruction information for the slope of the surface may be output in order as illustrated in FIG. 13. The correction instruction information for the slope of the surface may be output first. Alternatively, the both pieces of correction instruction information may be output simultaneously. In the case of outputting the both pieces of correction instruction information simultaneously, not only instruction information of the distance information is output as illustrated in S15 to S17, but also instruction information of slope information is output together.

As described above, in the present exemplary embodiment, after a determination condition for installing the imaging apparatus 1 to squarely face the target surface is set, image information of the target surface is acquired by the imaging apparatus. Subsequently, an inspection region is determined based on the image information acquired by the imaging apparatus, distance statistical information and the slope of the surface are acquired as the position and orientation of the target surface, and OK/NG determination is performed based on the determination condition. Then, if the determination result indicates NG, a method for correcting the state so as to be determined OK is acquired, an output method for the correction is determined, and the correction method is output to the user.

With this configuration, the imaging apparatus 1 can be easily installed to squarely face the target surface. It is therefore possible to shorten a preparation time taken for activating the apparatus.

Next, a third exemplary embodiment will be described. In the third exemplary embodiment, a position information acquisition unit 104 is configured to further acquire region information in addition to the functions in the above-described first exemplary embodiment. The region information refers to at least one of an area or a center position in a set distance range in a set inspection region. An area or a center position of a part of the inspection region may be obtained. When an area or a center position of a part of the inspection region is obtained, an area or a center position of an arbitrary region set by the user may be obtained, or an area or a center position of a region satisfying a certain condition may be obtained. As an example of the condition, an image can be binarized and regions be set for the binarized image, and an area or a center position of each of the binarized regions may be obtained, or an area or a center position of the entire binarized regions may be obtained.

Specifically, similarly to the above-described first exemplary embodiment, first of all, after a determination condition for determining inspection OK/NG is set, image information of a target object is acquired by an imaging apparatus. Subsequently, an inspection region is determined based on the image information acquired by the imaging apparatus, region information is acquired as position and orientation of a target surface, and OK/NG determination is performed based on the determination condition. The presence or absence of the target object is thereby inspected. If the determination result indicates NG, a method for correcting the state so as to be determined OK is acquired, an output method for the correction is determined, and instruction information of the correction is output to the user.

With this configuration, it is possible to inspect the presence or absence of an object in an inspection region and identify a correction method by performing image capturing only once. It is therefore possible to efficiently perform a process of inspecting the presence or absence of a cap before shipping plastic bottles in a distribution site, for example.

Figure 17:
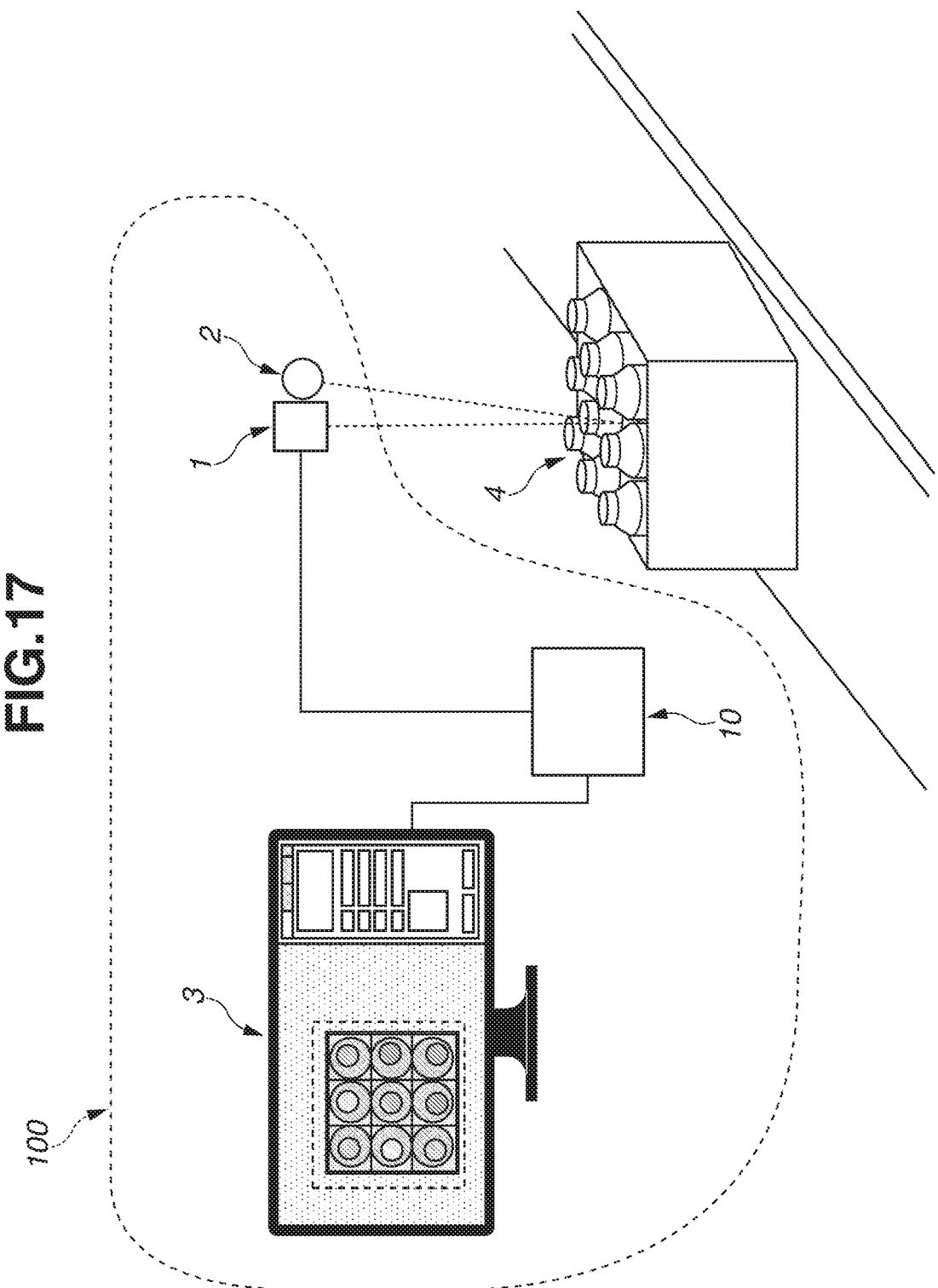
FIG. 17 is a diagram illustrating a configuration example of an information processing system.

FIG. 17 is a diagram illustrating a configuration example of an information processing system 100" including an information processing apparatus 10" according to the present exemplary embodiment. FIG. 17 illustrates an example of a device configuration, and is not intended to limit the scope of every embodiment.

A target object 4" is an object, such as a box of plastic bottles packed in a cardboard box in a preshipment process, that is assumed to be inspected by the information processing system 100". An inspection in the present exemplary embodiment is an inspection of the presence or absence of a cap of a plastic bottle, for example. Alternatively, the presence or absence of a plastic bottle main body or the position of a plastic bottle may be inspected, or the type of the cap may be inspected in addition to the presence or absence of the cap.

Figure 18:
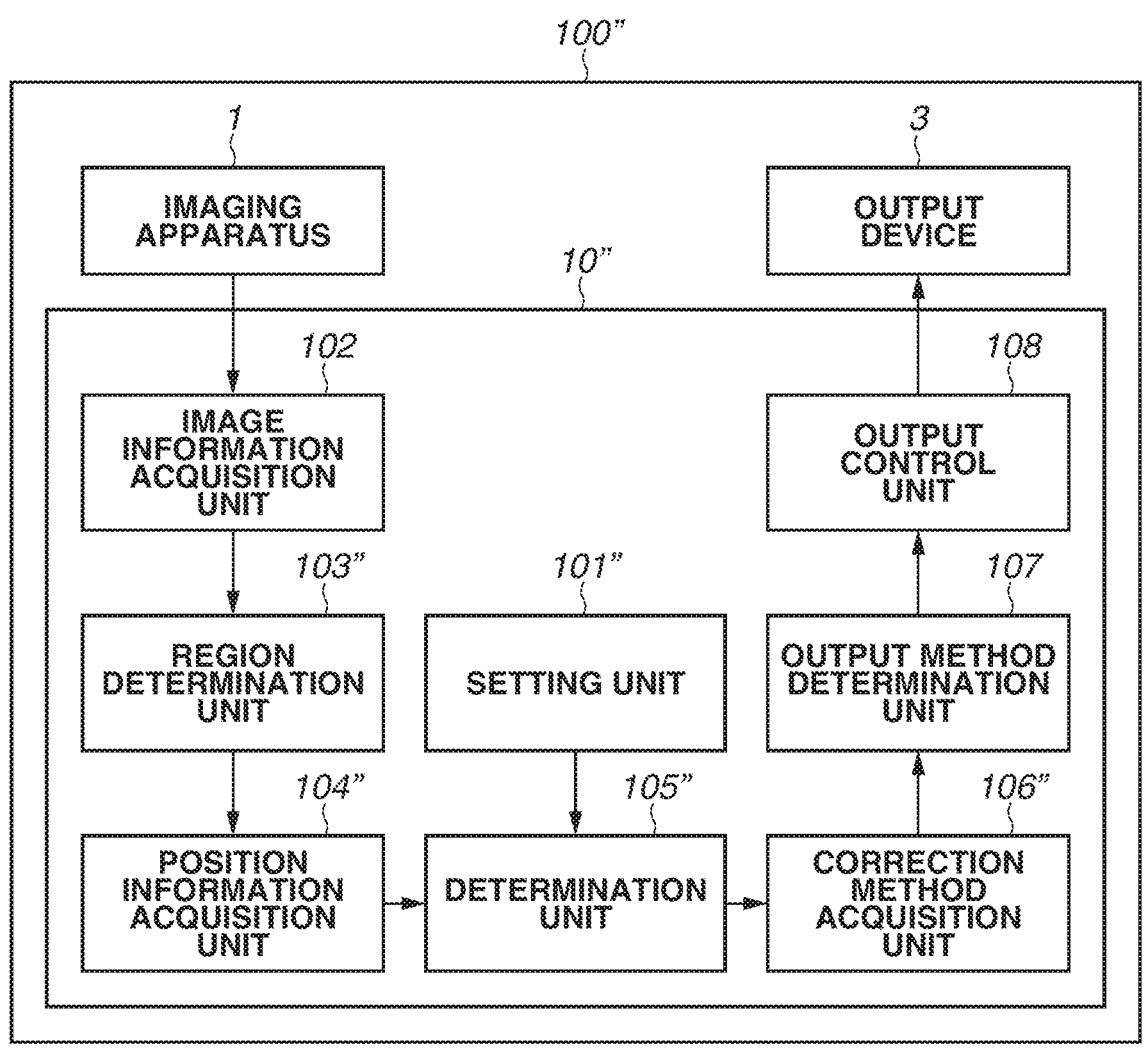
FIG. 18 is a block diagram illustrating a functional configuration example of the information processing system.

FIG. 18 is a functional block diagram of the information processing system 100" and the information processing apparatus 10" according to the present exemplary embodiment. The information processing system 100" and the information processing apparatus 10" illustrated in FIG. 18 differ from the information processing system 100 and the information processing apparatus 10 illustrated in FIG. 2 in processing to be performed by the setting unit 101, the region determination unit 103, the position information acquisition unit 104, the determination unit 105, and the correction method acquisition unit 106.

Based on region information, a setting unit 101" sets a determination condition for inspection OK/NG to be determined by the information processing system 100". The setting unit 101" transmits the set determination condition to a determination unit 105". While the slope is set as a determination condition in the first exemplary embodiment, in the present exemplary embodiment, an area or a central coordinate (X, Y) in a set region is set as region information.

A region determination unit 103" determines a region to be inspected, based on image information input by the image information acquisition unit 102. A distance range of the region may be set in addition to the setting on the XY plane of an image as in the first and second exemplary embodiments. The region determination unit 103" transmits the determined region information to a position information acquisition unit 104".

The position information acquisition unit 104" acquires a position and orientation in the region input from the region determination unit 103". The position information acquisition unit 104" transmits the position information to the determination unit 105". While the slope of the surface is acquired in the first exemplary embodiment, in the present exemplary embodiment, an area or a central coordinate (X, Y) of the region is acquired as region information. The area and the central coordinate of the entire region may be obtained, the area and the central coordinate of a part of the region may be obtained, or the area and the central coordinate of each of a plurality of regions may be obtained. The area and the central coordinate may be acquired after noise reduction processing, such as dilation/erosion processing, is performed as preprocessing.

Based on the determination condition input from the setting unit 101" and the position information input from the position information acquisition unit 104", the determination unit 105" determines inspection OK/NG. The determination unit 105" transmits a result of inspection OK/NG to a correction method acquisition unit 106". While the determination is performed based on the slope of the surface in the first exemplary embodiment, in the present exemplary embodiment, the determination is performed based on the region information.

Based on the determination result input from the determination unit 105", the correction method acquisition unit 106" acquires a method for correcting the state to an OK state, if the determination result indicates NG. The correction method acquisition unit 106" transmits the acquired correction method to the output method determination unit 107. While the correction method is determined to correct the slope of the surface in the first exemplary embodiment, in the present exemplary embodiment, the correction method is determined to correct the region information. For example, in the case of inspecting the presence or absence of a cap of a plastic bottle, if a cap of a part of plastic bottles in a box is missing, an instruction is presented so as to replace the plastic bottle at the corresponding location.

Figure 19:
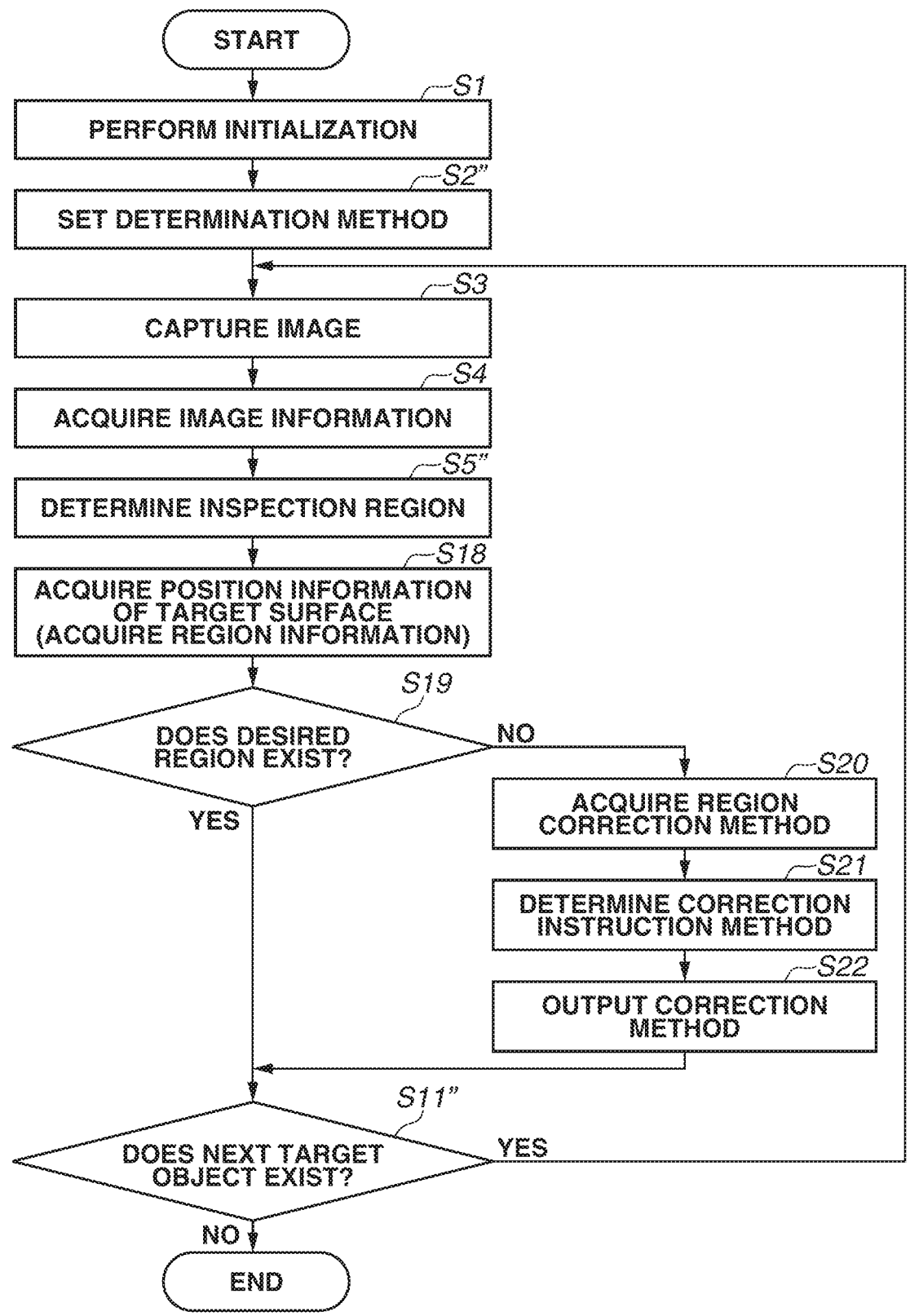
FIG. 19 is a flowchart illustrating processing executed by the information processing system.

FIG. 19 is a flowchart illustrating an inspection procedure executed by the information processing system 100" and the information processing apparatus 10" according to the present exemplary embodiment. Since processing differs from the processing illustrated in FIG. 3 in the first exemplary embodiment in some operations, differences will be described.

In S2", a determination condition for inspection OK/NG is set. The determination condition corresponds to an area or a central coordinate (X, Y) of a region, for example. If the presence or absence of the cap of the plastic bottle being the target object 4" is to be checked, an area in an inspection region is used. Specifically, when an inspection region is set in an image as indicated by a broken line quadrilateral frame illustrated in FIG. 20, a shaded portion in the frame corresponds to a region of a cap. Thus, an area of the shaded portion is set as a determination condition. For example, when an area of one cap in the image is denoted by "s", if there are nine caps, the area of the caps becomes "9s". When a variation of ±5% of an area is determined to be OK in the inspection, as a range of an area S, a range determined to be OK is set as follows.

$$0.95 \times 9s \leq S \leq 1.05 \times 9s \tag{14}$$

Alternatively, an area may be set for each partial region instead of setting an area in the entire image. When an area in this case is denoted by $S_b$, a range determined to be OK is set as follows.

$$0.95 \times s \leq S_b \leq 1.05 \times s \tag{15}$$

Figure 22:
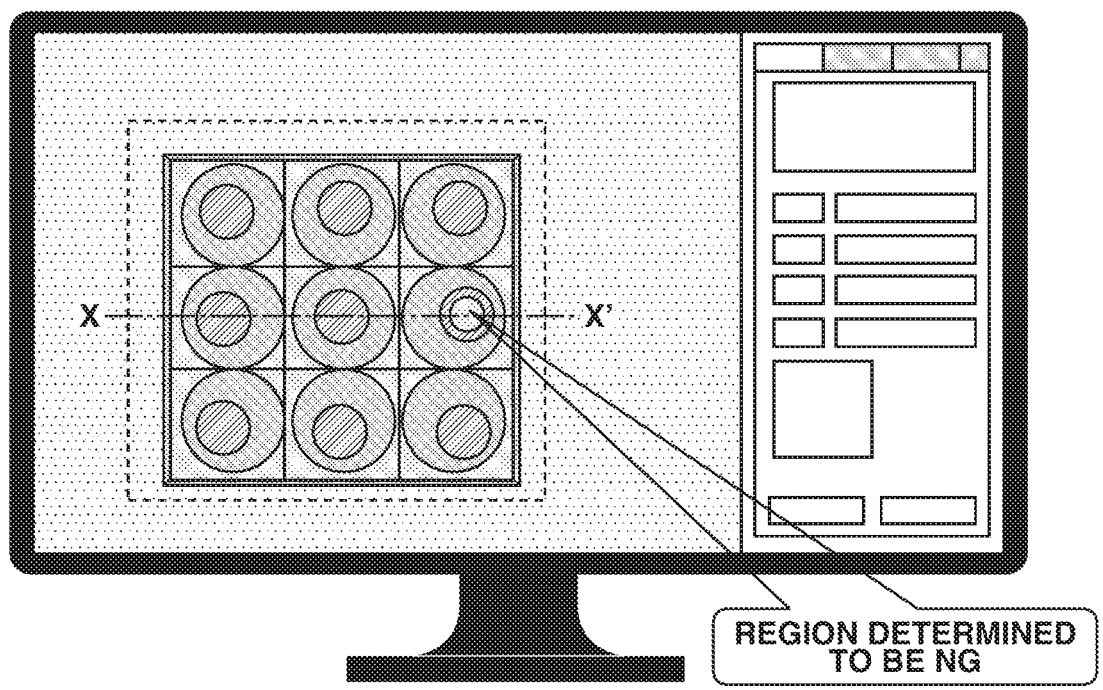
FIG. 22 is a diagram illustrating an example of an NG-detected point.

Furthermore, when regions are arranged at regular intervals as illustrated in FIG. 22, using a central coordinate (Xn, Yn) of each of the regions, it is determined whether a cap exists at a predetermined position (xn, yn). When a position within a variation of ±2 mm is determined to be OK, the following conditions are set for nine target objects n=1, 2, . . . , 9.

$$(x_n-2) \text{ mm} \leq X_n \leq (x_n+2) \text{ mm} \tag{16}$$

$$(y_n-2) \text{ mm} \leq Y_n \leq (y_n+2) \text{ mm} \tag{17}$$

An area and a center position may be set using the number of pixels in an image coordinate system, may be set using a physical amount after conversion into a world coordinate system, or may be set after conversion into another coordinate system or a unit system.

Figure 21:
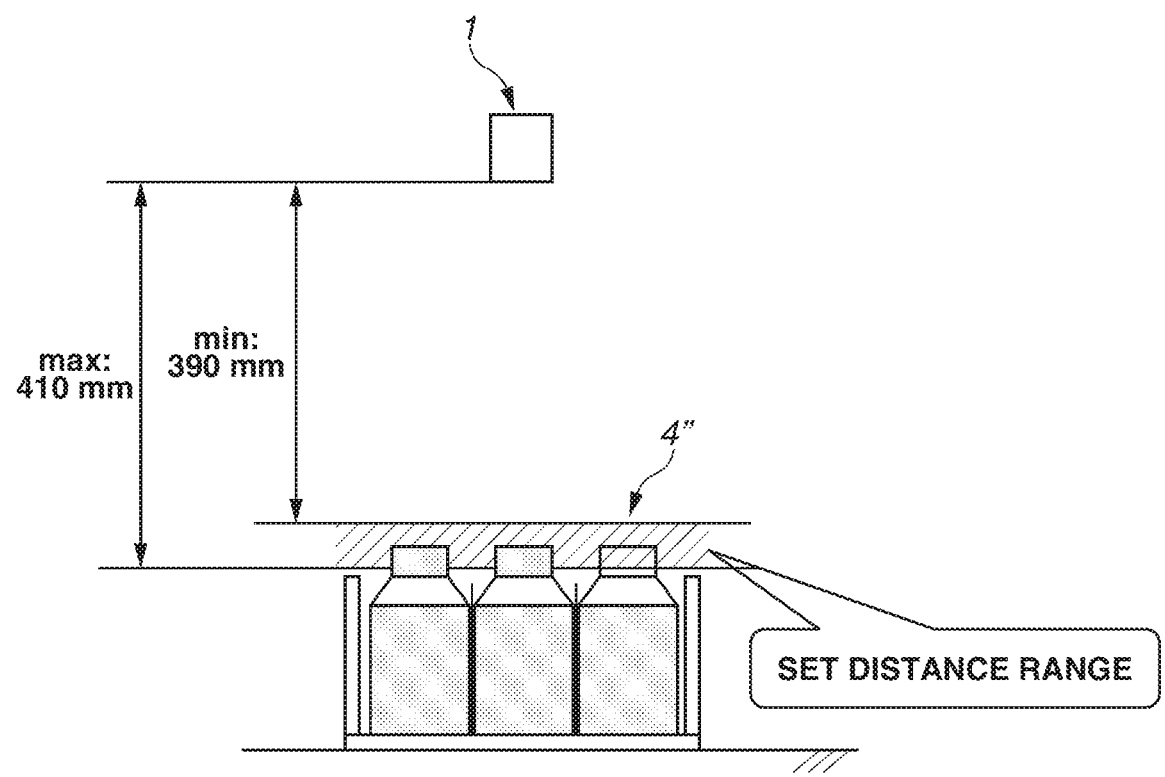
FIG. 21 is a diagram illustrating an example of a method for setting a condition for an inspection.

In S5", an inspection region is determined. As a method for determining the region, for example, the region may be preset by the user or may be set based on acquired image information as in the first exemplary embodiment. In the present exemplary embodiment, a distance is also set as the region in addition to a plane. For example, in the case of inspecting a cap of a plastic bottle, a distance to the cap top surface of the plastic bottle is set as a region. When a distance from the imaging apparatus 1 to the cap top surface of the plastic bottle of the target object 4" is set to 400 mm as illustrated in FIG. 21, a region within ±10 mm of 400 mm is set as an inspection region. FIG. 21 is a cross-sectional view taken along a line X-X' in a distance image illustrated in FIG. 22.

Figure 20:
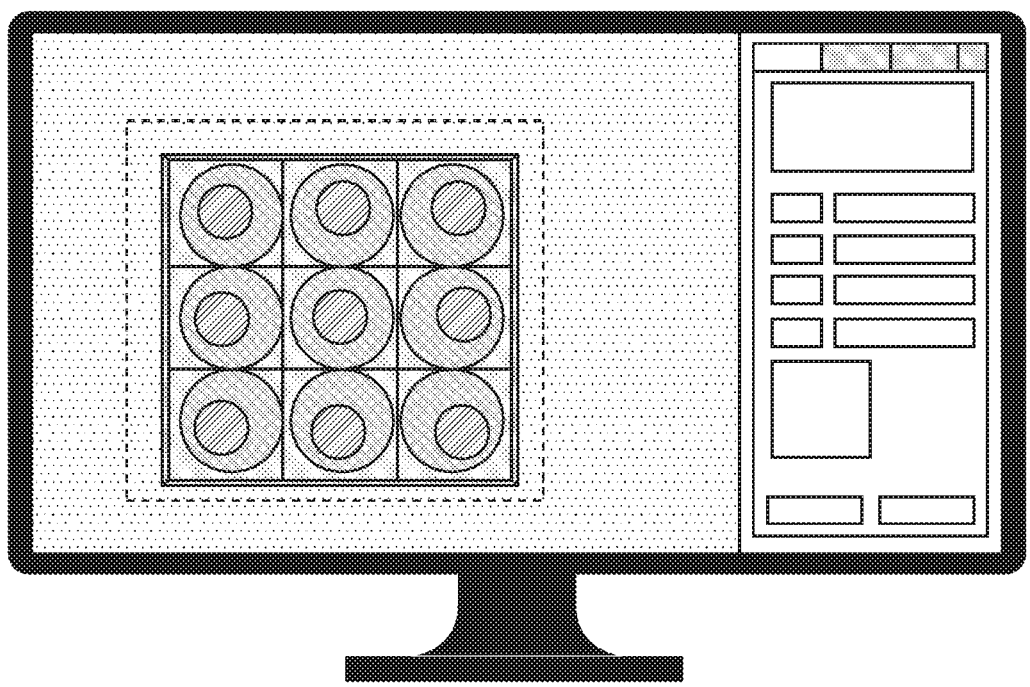
FIG. 20 is a diagram illustrating an example of a method for setting a region to be inspected.

In S18, region information is acquired as a position and orientation inspection of the target surface. For example, an area of a shaded portion illustrated in FIG. 20 is obtained. As a method for obtaining the area, based on the distance image information acquired in S4, a target region is determined using the region information set in S5", and then, the number of pixels included in an XY region of the image and the range of the set distance information is obtained. A total area may be obtained or an area of each region may be obtained.

In S19, OK/NG determination as to whether a desired region exists is performed. The determination is performed based on whether the result of the position and orientation that has been acquired in S18 falls within the OK range of the determination condition set in S2". Specifically, the determination is performed based on whether the area and the center position of the region that have been acquired in S18 fall within the ranges set in S2". If the area and the center position do not fall within the ranges (NO in S19), the determination result indicates NG and the processing proceeds to S20. If the area and the center position fall within the ranges (YES in S19), the determination result indicates OK and the processing proceeds to S11".

In S20, a method for correcting an inspection result to OK is acquired. Specifically, a method for correcting the position and orientation for causing the acquired region information to fall within the ranges determined to be inspection OK that have been set in S2" is acquired. For example, if there is a region determined to be NG, as illustrated in FIG. 22, the corresponding point is presented to the user in such a manner that the user can recognize the plastic bottle to be corrected.

In S21, a method for outputting the correction method to the user is determined. For example, the correction method is projected onto the NG point in the region using a projector. Alternatively, a voice instruction saying that a point on the second row in the third column is determined to be NG as illustrated in FIG. 22 is output using a speaker. Alternatively, the instruction may be presented by displaying the NG point on a display as illustrated in FIG. 22.

In S22, based on the output method determined in S21, a correction instruction is output to the user using an output device.

In S11", the CPU 11 determines whether the next target object 4" exists. Then, if the next target object 4" does not exist (NO in S11"), the CPU 11 determines to end the processing and ends the processing illustrated in FIG. 19. If the next target object 4" exists (YES in S11"), the CPU 11 determines to continue the processing and the processing returns to S3.

As described above, in the present exemplary embodiment, after a determination condition for inspecting the presence or absence of a target object is set, image information of the target object is acquired by an imaging apparatus. Subsequently, an inspection region is determined, region information, such as an area and a central coordinate (X, Y), is acquired as the position and orientation of the target surface, and OK/NG determination is performed based on the determination condition. Then, if the determination result indicates NG, the corresponding point is presented to the user.

With this configuration, it is possible to inspect the presence or absence of an object in an inspection region and identify a correction method by performing image capturing only once. It is therefore possible to efficiently perform a process of inspecting the presence or absence of a cap before shipping plastic bottles in a distribution site, for example.

(Hardware Configuration)

The information processing apparatus 10 is a personal computer (PC), for example. FIG. 23 illustrates an example of a hardware configuration of the information processing apparatus 10. The information processing apparatus 10 includes the CPU 11, the ROM 12, the RAM 13, the external memory 14, an input unit 15, a display unit 16, a communication interface (I/F) 17, and a system bus 18. The CPU 11 comprehensively controls an operation in the information processing apparatus 10, and controls the components (11 to 17) via the system bus 18. The ROM 12 is a nonvolatile memory storing a program necessary for the CPU 11 executing processing. The program may be stored in the external memory 14 or a removable storage medium (not illustrated). The RAM 13 functions as a main memory and a work area of the CPU 11. More specifically, in executing processing, the CPU 11 loads necessary programs from the ROM 12 onto the RAM 13, and implements various functional operations by executing the programs.

The external memory 14 stores various types of data and various types of information that are necessary for the CPU 11 performing processing using programs, for example. The external memory 14 also stores various types of data and various types of information that are obtained by the CPU 11 performing processing using programs, for example. The input unit 15 includes, for example, a keyboard and a pointing device, such as a mouse, and an operator can issue an instruction to the information processing apparatus 10 via the input unit 15. The display unit 16 includes a monitor, such as a liquid crystal display (LCD). The communication I/F 17 is an interface for communicating with an external device. The system bus 18 connects the CPU 11, the ROM 12, the RAM 13, the external memory 14, the input unit 15, the display unit 16, and the communication I/F 17 in such a manner that communication can be performed therebetween. In this manner, the information processing apparatus 10 is connected via the communication I/F 17 with the imaging apparatus 1, the light source 2, and the output device 3, which are external devices, in such a manner that communication can be performed therebetween, and controls operations of these external devices.

According to the first exemplary embodiment, by inspecting the inclination of the target surface and presenting a correction method to the user if the target surface is inclined, the user can easily recognize the correction method. It is therefore possible to correct the target surface in a short time and enhance work efficiency.

According to the second exemplary embodiment, by presenting, to the user, a method for installing the imaging apparatus 1 to squarely face the target surface, based on the slope and the distance from the imaging apparatus 1 to the target surface, the user can easily install the imaging apparatus 1 to squarely face the target surface. It is therefore possible to enhance work efficiency.

According to the third exemplary embodiment, by inspecting the presence or absence of a target object and presenting a point where the target object does not exist, to the user, the user can easily recognize the point to be corrected. It is therefore possible to enhance work efficiency.

Other Exemplary Embodiments

Figure 24A:
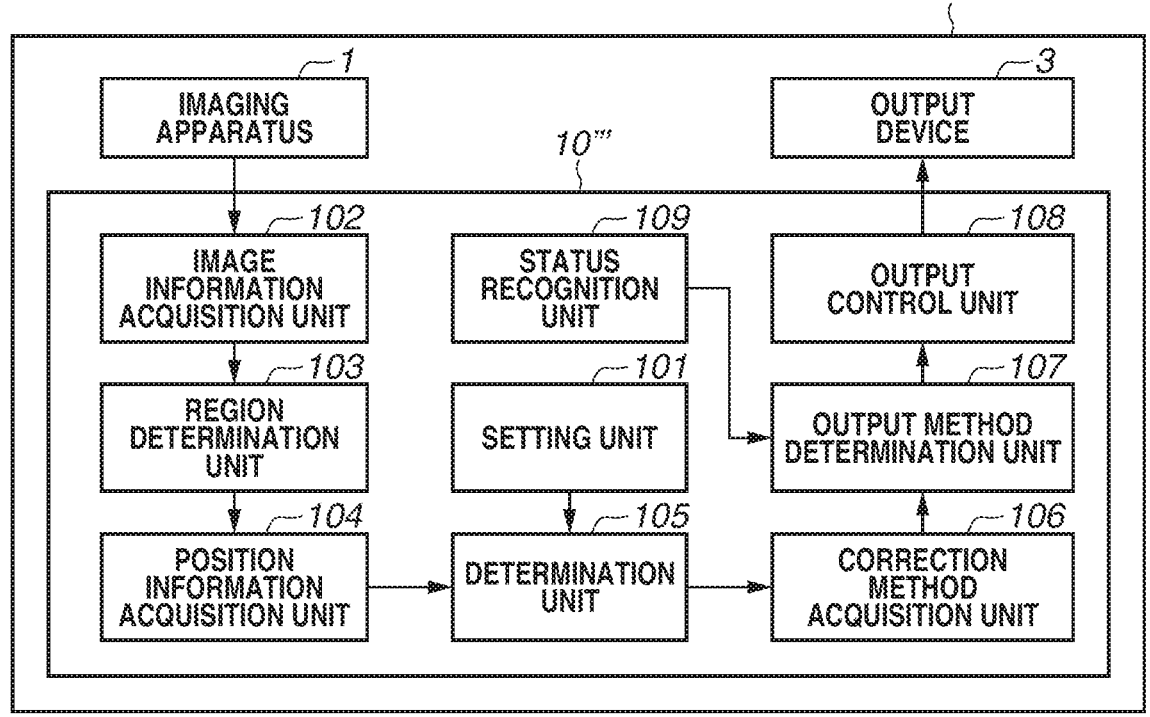
FIGS. 24A and 24B are diagrams each illustrating a configuration example of an information processing system.

In the first to the third exemplary embodiments, the output method determination unit 107 may determine an output method based on an environment and the state of the user that have been acquired by a status recognition unit 109 as illustrated in FIG. 24A. The status recognition unit 109 is a microphone, for example, and recognizes ambient sound as environment information. If ambient sound is noisy, the output method determination unit 107 determines that it is not appropriate to output a correction method by sound in a noisy environment, for example, and determines a method for displaying the correction method on a display or a method for outputting the correction method by projecting the correction method onto the target object. In addition, the status recognition unit 109 is an imaging apparatus, for example, and recognizes the position of the user as the state of the user. When the user is distant from a display, since it is difficult for the user to view instruction information even if the instruction information is displayed on the display, the instruction information is output by voice. Alternatively, when the user is looking at the target object, a method for presenting instruction information by projecting the instruction information onto the target object is determined.

Figure 24B:
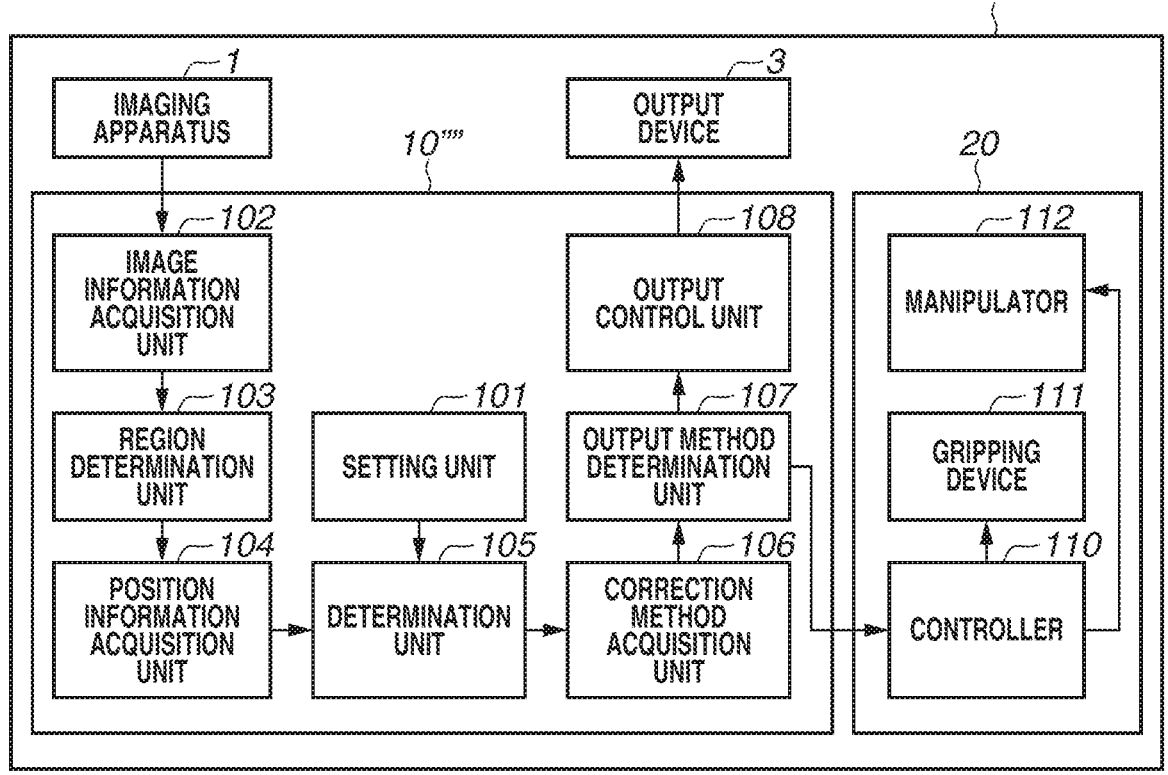

In the first to the third exemplary embodiments, an output method determination unit may determine control information of a mechanical device instead of determining an output method. The control information is transmitted to the mechanical device and control information for correcting a state of a target object to a desired state is determined. For example, a configuration as illustrated in FIG. 24B may be employed. In FIG. 24B, a mechanical device 20 is a multijoint robot, for example, and includes a manipulator 112 such as a robot arm, a gripping device 111, such as a robot hand, and a controller 110 that controls the manipulator 112 and the gripping device 111. The mechanical device 20 also includes a position and orientation changing mechanism that can change the position and orientation of the gripping device 111 by changing an angle of each joint of the manipulator 112. The position and orientation changing mechanism may be driven by an electrical motor, or may be driven by an actuator operated by fluid pressure, such as hydraulic pressure or air pressure. The position and orientation changing mechanism is driven in accordance with operation instruction information output from the information processing apparatus 10. In addition, the mechanical device 20 is not limited to a multijoint robot, and may be a movable machine operable by numerical control (NC). The controller 110 may be a robot controller associated with the manipulator 112 or may be a programmable logic controller (PLC). The controller 110 may be a device other than these, as long as the device is capable of controlling the manipulator 112 and the gripping device 111. The controller 110 may be installed near the mechanical device 20, may be integrated with the manipulator 112, or may be installed at another location. The controller 110 controls the manipulator 112 and the gripping device 111. The mechanical device 20 executes correction based on an output method determined by the output method determination unit 107. For example, in the case of the first exemplary embodiment, the manipulator 112 and the gripping device 111 operate so as to correct the slope of the surface of the target object 4. With this configuration, it is possible to correct a defective product using a robot without involving manpower.

In the first to the third exemplary embodiments, a color image may be used also for an inspection not just for the setting of an inspection region. For example, in the third exemplary embodiment, after the presence or absence of a cap of a plastic bottle is inspected, if it is determined that the cap exists, the inspection of the type may be further performed using the color image. Specifically, for each region determined to include a cap in inspecting the presence or absence of the cap, texture information of a cap portion is acquired using the color image of a corresponding point. Based on the texture information, it is determined whether the cap is a target cap.

Some embodiments are also implemented by executing the following processing. More specifically, software (program) for implementing functions of the above-described exemplary embodiments is supplied to a system or an apparatus via a data communication network or various storage media. Then, a computer (or a CPU, a microprocessor unit (MPU), etc.) of the system or the apparatus reads out the program and executes the program. In addition, the program may be provided by being recorded onto a computer-readable recording medium.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2019-013224, which was filed on Jan. 29, 2019 and which is hereby incorporated by reference herein in its entirety.

What is claimed is:

1. An information processing apparatus that inspects a state of a target object using distance information obtained by measuring the target object, the information processing apparatus comprising:
one or more processors and one or more memories that cooperate to:
obtain a plane of a part of the target object based on the distance information, and acquire an angle between the obtained plane of the part of the target object and a predetermined plane, wherein the predetermined plane represents a desired state of the target object; and
output, in a case where the angle between the obtained plane of the part of the target object and the predetermined plane does not satisfy a condition set based on a plurality of pieces of distance information obtained by capturing a plurality of target objects using an image capturing apparatus, based on the angle and the condition, first information regarding a direction in which the part of the target object is to be moved from a current state of the target object to a state satisfying the condition, wherein the obtained plane represents an undesired state of the target object when the angle between the obtained plane of the part of the target object and the predetermined plane does not satisfy the condition, the undesired state representing an abnormality of the target object; and
output, in a case where the angle between the obtained plane of the part of the target object and the predetermined plane satisfies the condition, second information indicating that the angle between the obtained plane of the part of the target object and the predetermined plane satisfies the condition,
wherein the distance information is third information regarding a distance between the image capturing apparatus and the target object, the third information being obtained based on an image obtained by capturing the target object using the image capturing apparatus, and
wherein the plurality of pieces of distance information for the plurality of target objects are obtained based on images that are different from each other.

2. The information processing apparatus according to claim 1, wherein, in a case where the angle between the plane of the part of the target object and the predetermined plane does not satisfy the condition, the one or more processors and the one or more memories further cooperate to output, based on the plane of the part of the target object and the condition, information indicating, by a vector, the direction in which the part of the target object is to be moved from the current state of the target object to the state satisfying the condition.

3. The information processing apparatus according to claim 2, wherein the information indicating the direction by the vector is information indicating a magnitude of a difference.

4. The information processing apparatus according to claim 1, wherein, in a case where the angle between the plane of the part of the target object and the predetermined plane does not satisfy the condition, the one or more processors and the one or more memories further cooperate to output, based on the plane of the part of the target object and the condition, a direction in which the target object is to be rotated.

5. The information processing apparatus according to claim 4, wherein, in a case where the angle between the plane of the part of the target object and the predetermined plane does not satisfy the condition, the one or more processors and the one or more memories further cooperate to output, based on the plane of the part of the target object and the condition, an amount by which the target object is to be rotated.

6. The information processing apparatus according to claim 1, wherein the one or more processors and the one or more memories further cooperate to output the direction in which the part of the target object is to be moved, based on a difference between the plane of the part of the target object and a state in which the target object satisfies the condition.

7. The information processing apparatus according to claim 1,
wherein the distance information obtained by measuring the target object is obtained by measuring the target object from above,
wherein the part of the target object is a top surface of the target object, and
wherein the direction is a direction in which the top surface of the target object is to be moved.

8. The information processing apparatus according to claim 1, wherein the one or more processors and the one or more memories further cooperate to output an amount by which the part of the target object is to be moved from the current state of the target object to the state satisfying the condition.

9. The information processing apparatus according to claim 1, wherein the one or more processors and the one or more memories further cooperate to display the first information regarding the direction in which the part of the target object is to be moved.

10. The information processing apparatus according to claim 1, wherein the one or more processors and the one or more memories further cooperate to project the first information regarding the direction in which the part of the target object is to be moved.

11. The information processing apparatus according to claim 1, wherein the one or more processors and the one or more memories further cooperate to reproduce the first information regarding the direction in which the part of the target object is to be moved.

12. The information processing apparatus according to claim 1,
wherein the distance information is obtained based on a captured image of the target object, and
wherein the one or more processors and the one or more memories further cooperate to acquire an aggregate of three-dimensional positions representing a surface of the target object based on the distance information.

13. The information processing apparatus according to claim 1, wherein the current state of the target object indicates a slope formed by a lid of the target object and the predetermined plane.

14. The information processing apparatus according to claim 1, wherein the state of the target object includes information indicating presence or absence of a component included in the target object.

15. The information processing apparatus according to claim 1, wherein the one or more processors and the one or more memories further cooperate to:
set, as the condition, a predetermined range of the angle, relative to the predetermined plane, of the plane of the part of the target object, based on a model representing a state of the target object; and
determine, based on the condition and the angle between the plane of the part of the target object and the predetermined plane, whether the target object satisfies the condition,
wherein, in a case where the condition is not satisfied, the one or more processors and the one or more memories further cooperate to output the first information regarding the direction in which the part of the target object is to be moved.

16. The information processing apparatus according to claim 15, wherein the one or more processors and the one or more memories further cooperate to:
acquire a captured image of the target object;
determine a region in the captured image that is to be inspected, based on image information of the target object included in the captured image; and
set, for the region, the angle between the plane of the part of the target object and the predetermined plane, as the condition.

17. The information processing apparatus according to claim 16, wherein the one or more processors and the one or more memories further cooperate to display the captured image of the target object and the plane of the part of the target object by superimposing the plane of the part of the target object onto the captured image of the target object.

18. The information processing apparatus according to claim 1, wherein the one or more processors and the one or more memories further cooperate to display the plane of the part of the target object by distinguishing a region satisfying the condition from a region not satisfying the condition.

19. The information processing apparatus according to claim 1, wherein the target object is moved by a belt conveyer.

20. A non-transitory computer-readable storage medium storing a program for causing a computer to execute an information processing method for inspecting a state of a target object using distance information obtained by measuring the target object, the information processing method comprising:
obtaining a plane of a part of the target object based on the distance information, and acquiring an angle between the plane of the part of the target object and a predetermined plane, wherein the predetermined plane represents a desired state of the target object; and
outputting, in a case where the angle between the obtained plane of the part of the target object and the predetermined plane does not satisfy a condition set based on a plurality of pieces of distance information obtained by capturing a plurality of target objects using an image capturing apparatus, based on the angle and the condition, first information regarding a direction in which the part of the target object is to be moved from a current state of the target object to a state satisfying the condition, wherein the obtained plane represents an undesired state of the target object when the angle between the obtained plane of the part of the target object and the predetermined plane does not satisfy the condition, the undesired state representing an abnormality of the target object; and
outputting, in a case where the angle between the obtained plane of the part of the target object and the predetermined plane satisfies the condition, second information indicating that the angle between the obtained plane of the part of the target object and the predetermined plane satisfies the condition,
wherein the distance information is third information regarding a distance between the image capturing apparatus and the target object, the third information being obtained based on an image obtained by capturing the target object using the image capturing apparatus, and
wherein the plurality of pieces of distance information for the plurality of target objects are obtained based on images that are different from each other.

21. An information processing method for inspecting a state of a target object using distance information obtained by measuring the target object, the information processing method comprising:
obtaining a plane of a part of the target object, based on the distance information, and acquiring an angle between the plane of the part of the target object and a predetermined plane, wherein the predetermined plane represents a desired state of the target object; and
outputting, in a case where the angle between the obtained plane of the part of the target object and the predetermined plane does not satisfy a condition set based on a plurality of pieces of distance information obtained by capturing a plurality of target objects using an image capturing apparatus, based on the angle and the condition, first information regarding a direction in which the part of the target object is to be moved from a current state of the target object to a state satisfying the condition, wherein the obtained plane represents an undesired state of the target object when the angle between the obtained plane of the part of the target object and the predetermined plane does not satisfy the condition, the undesired state representing an abnormality of the target object; and
outputting, in a case where the angle between the obtained plane of the part of the target object and the predetermined plane satisfies the condition, second information indicating that the angle between the obtained plane of the part of the target object and the predetermined plane satisfies the condition, wherein the distance information is third information regarding a distance between the image capturing apparatus and the target object, the third information being obtained based on an image obtained by capturing the target object using the image capturing apparatus, and wherein the plurality of pieces of distance information for the plurality of target objects are obtained based on images that are different from each other.

* * * * *